(12) United States Patent
Krupnikov et al.

(10) Patent No.: US 9,352,267 B2
(45) Date of Patent: May 31, 2016

(54) ABSORBENT AND/OR ADSORPTIVE FILTER MEDIA

(71) Applicant: Hollingsworth & Vose Company, East Walpole, MA (US)

(72) Inventors: Svetlana Krupnikov, Ashland, MA (US); Erich Jurgen Gaudry Sada, Ciudad de México (MX)

(73) Assignee: Hollingsworth & Vose Company, East Walpole, MA (US)

(*) Notice: Subject to any disclaimer, the term of this patent is extended or adjusted under 35 U.S.C. 154(b) by 0 days.

(21) Appl. No.: 13/723,607

(22) Filed: Dec. 21, 2012

(65) Prior Publication Data

US 2013/0340613 A1    Dec. 26, 2013

Related U.S. Application Data

(60) Provisional application No. 61/662,309, filed on Jun. 20, 2012.

(51) Int. Cl.
*B01D 53/02* (2006.01)
*B01D 53/04* (2006.01)
*B01D 39/16* (2006.01)
*B01D 39/18* (2006.01)

(52) U.S. Cl.
CPC ........ *B01D 53/0407* (2013.01); *B01D 39/1623* (2013.01); *B01D 39/18* (2013.01); *B01D 53/02* (2013.01); *B01D 2239/0407* (2013.01); *B01D 2239/064* (2013.01); *B01D 2239/0654* (2013.01); *B01D 2239/1233* (2013.01); *B01D 2253/202* (2013.01); *B01D 2257/80* (2013.01)

(58) Field of Classification Search
CPC .................................................. B01D 53/0407
See application file for complete search history.

(56) References Cited

U.S. PATENT DOCUMENTS

| | | | |
|---|---|---|---|
| 3,083,118 A | 3/1963 | Bridgeford |
| 3,290,207 A | 12/1966 | Magat et al. |
| 3,353,682 A | 11/1967 | Pall et al. |
| 3,413,982 A | 12/1968 | Sublett et al. |
| 3,441,515 A | 4/1969 | Oshida et al. |
| 3,474,600 A | 10/1969 | Tobias |
| 3,500,618 A | 3/1970 | Sokol |
| 3,544,507 A | 12/1970 | Lloyd |
| 3,611,678 A | 10/1971 | Holden |

(Continued)

FOREIGN PATENT DOCUMENTS

| | | |
|---|---|---|
| CA | 1190486 A1 | 7/1985 |
| CN | 1891325 A | 1/2007 |

(Continued)

OTHER PUBLICATIONS

International Search Report and Written Opinion for Application No. PCT/US/2013/46744 mailed Nov. 12, 2013.

(Continued)

*Primary Examiner* — Christopher P Jones
(74) *Attorney, Agent, or Firm* — Wolf, Greenfield & Sacks, P.C.

(57) ABSTRACT

Filter media suitable for various applications and related components, systems, and methods associated therewith are described. The filter media may include a composite structure having a mixture comprising fibrillated fibers (e.g., lyocell) and functional particles. The filter media may exhibit favorable absorption and/or adsorption characteristics.

32 Claims, 6 Drawing Sheets

(56) References Cited

U.S. PATENT DOCUMENTS

| | | |
|---|---|---|
| 3,769,144 A | 10/1973 | Economy et al. |
| 3,850,785 A | 11/1974 | McQuade et al. |
| 4,169,911 A | 10/1979 | Yoshida et al. |
| 4,217,386 A | 8/1980 | Arons et al. |
| 4,397,907 A | 8/1983 | Rosser et al. |
| 4,433,024 A | 2/1984 | Eian |
| 4,472,541 A | 9/1984 | Sorensen et al. |
| 4,565,727 A | 1/1986 | Giglia et al. |
| 4,639,513 A | 1/1987 | Hou et al. |
| 4,650,506 A | 3/1987 | Barris et al. |
| 4,728,349 A | 3/1988 | Oshitari |
| 4,830,709 A | 5/1989 | Turner et al. |
| 4,859,340 A | 8/1989 | Hou et al. |
| 4,904,343 A | 2/1990 | Giglia et al. |
| 4,943,475 A | 7/1990 | Baker et al. |
| 4,981,515 A | 1/1991 | Hiraoka et al. |
| 5,019,254 A | 5/1991 | Abrevaya et al. |
| 5,079,792 A | 1/1992 | D'Haen |
| 5,196,470 A | 3/1993 | Anderson et al. |
| 5,221,573 A | 6/1993 | Baigas, Jr. |
| 5,366,832 A | 11/1994 | Hayashi et al. |
| 5,486,410 A | 1/1996 | Groeger et al. |
| 5,496,396 A | 3/1996 | Allan et al. |
| 5,500,038 A | 3/1996 | Dauber et al. |
| 5,529,609 A | 6/1996 | Gooch et al. |
| 5,538,545 A | 7/1996 | Dauber et al. |
| 5,542,968 A | 8/1996 | Belding et al. |
| 5,565,062 A | 10/1996 | Nass et al. |
| 5,567,536 A | 10/1996 | Lintz et al. |
| 5,580,459 A | 12/1996 | Powers et al. |
| 5,634,954 A | 6/1997 | Kern |
| 5,662,728 A | 9/1997 | Groeger |
| 5,672,399 A | 9/1997 | Kahlbaugh et al. |
| 5,725,821 A | 3/1998 | Gannon et al. |
| 5,731,080 A | 3/1998 | Cousin et al. |
| 5,785,725 A | 7/1998 | Cusick et al. |
| 5,856,245 A | 1/1999 | Caldwell |
| 5,916,204 A | 6/1999 | Milani |
| 5,958,320 A | 9/1999 | Pitowski et al. |
| 5,983,469 A | 11/1999 | Beaty et al. |
| 5,989,736 A | 11/1999 | Lintz et al. |
| 5,997,618 A | 12/1999 | Schneider et al. |
| 6,001,639 A | 12/1999 | Schulein et al. |
| 6,024,813 A | 2/2000 | Groeger et al. |
| 6,042,769 A | 3/2000 | Gannon et al. |
| 6,159,601 A | 12/2000 | Pitowski et al. |
| 6,171,684 B1 | 1/2001 | Kahlbaugh et al. |
| 6,214,095 B1 | 4/2001 | Logan et al. |
| 6,221,487 B1 | 4/2001 | Luo et al. |
| 6,235,392 B1 | 5/2001 | Luo et al. |
| 6,296,691 B1 | 10/2001 | Gidumal |
| 6,302,932 B1 | 10/2001 | Unger et al. |
| 6,387,690 B1 | 5/2002 | Schulein et al. |
| 6,419,839 B1 | 7/2002 | Cox et al. |
| 6,511,930 B1 | 1/2003 | Luo et al. |
| 6,554,881 B1 | 4/2003 | Healey |
| 6,596,033 B1 | 7/2003 | Luo et al. |
| 6,656,861 B1 | 12/2003 | Bauer et al. |
| 6,660,172 B2 | 12/2003 | Koslow |
| 6,692,827 B2 | 2/2004 | Luo et al. |
| 6,706,876 B2 | 3/2004 | Luo et al. |
| 6,835,311 B2 | 12/2004 | Koslow |
| 6,855,531 B2 | 2/2005 | Shulein et al. |
| 6,872,311 B2 | 3/2005 | Koslow |
| 6,933,252 B2 | 8/2005 | Pierce |
| 6,939,492 B2 | 9/2005 | Jackson et al. |
| 7,008,465 B2 | 3/2006 | Graham et al. |
| 7,052,532 B1 | 5/2006 | Liu et al. |
| 7,137,510 B1 | 11/2006 | Klein et al. |
| 7,160,369 B2 | 1/2007 | von Blucher et al. |
| 7,214,727 B2 | 5/2007 | Kwon et al. |
| 7,226,773 B2 | 6/2007 | Schulein et al. |
| 7,228,973 B2 | 6/2007 | Simon |
| 7,244,497 B2 | 7/2007 | Hartmann et al. |
| 7,276,166 B2 | 10/2007 | Koslow |
| 7,296,691 B2 | 11/2007 | Koslow |
| 7,306,659 B2 | 12/2007 | Dauber et al. |
| 7,314,497 B2 | 1/2008 | Kahlbaugh et al. |
| 7,390,343 B2 | 6/2008 | Tepper et al. |
| 7,445,737 B2 | 11/2008 | Sanderson et al. |
| 7,501,012 B2 | 3/2009 | Tatarchuk et al. |
| 7,505,225 B2 | 3/2009 | Zhang et al. |
| 7,510,626 B2 | 3/2009 | Hamada et al. |
| 7,534,379 B2 | 5/2009 | Ellison et al. |
| 7,534,380 B2 | 5/2009 | Ellison et al. |
| 7,585,358 B2 | 9/2009 | Oo et al. |
| 7,655,112 B2 | 2/2010 | Koslow |
| 7,655,829 B2 | 2/2010 | MacDonald et al. |
| 7,670,678 B2 | 3/2010 | Phan |
| 7,727,297 B2 | 6/2010 | Dauber et al. |
| 7,749,357 B2 | 7/2010 | Kumamoto et al. |
| 8,012,312 B2 | 9/2011 | Goto et al. |
| 2002/0037407 A1 | 3/2002 | Luo et al. |
| 2003/0008214 A1 | 1/2003 | Zguris et al. |
| 2003/0054539 A1 | 3/2003 | Schulein et al. |
| 2003/0141261 A1 | 7/2003 | Koslow |
| 2003/0168401 A1 | 9/2003 | Koslow |
| 2003/0177909 A1 | 9/2003 | Koslow |
| 2004/0016345 A1 | 1/2004 | Springett et al. |
| 2004/0035095 A1 | 2/2004 | Healey |
| 2004/0043243 A1 | 3/2004 | Chen et al. |
| 2004/0055469 A1 | 3/2004 | Kroculick |
| 2004/0118287 A1 | 6/2004 | Jaffe et al. |
| 2004/0178142 A1 | 9/2004 | Koslow |
| 2004/0224594 A1 | 11/2004 | Choi et al. |
| 2004/0255783 A1 | 12/2004 | Graham et al. |
| 2005/0011827 A1 | 1/2005 | Koslow |
| 2005/0026526 A1 | 2/2005 | Verdegan et al. |
| 2005/0051487 A1 | 3/2005 | Koslow |
| 2005/0070003 A1 | 3/2005 | Schulein et al. |
| 2005/0142973 A1 | 6/2005 | Bletsos et al. |
| 2005/0216075 A1 | 9/2005 | Wang et al. |
| 2006/0102871 A1 | 5/2006 | Wang et al. |
| 2006/0134411 A1 | 6/2006 | Mackey et al. |
| 2006/0249705 A1 | 11/2006 | Wang et al. |
| 2007/0017075 A1 | 1/2007 | Nguyen |
| 2007/0017076 A1 | 1/2007 | Nguyen et al. |
| 2007/0020166 A1 | 1/2007 | Withiam et al. |
| 2007/0028767 A1 | 2/2007 | Choi et al. |
| 2007/0039300 A1 | 2/2007 | Kahlbaugh et al. |
| 2007/0154510 A1 | 7/2007 | Wilcher et al. |
| 2007/0221569 A1 | 9/2007 | Stouffer et al. |
| 2007/0232178 A1 | 10/2007 | Polat et al. |
| 2007/0232179 A1 | 10/2007 | Polat et al. |
| 2007/0251624 A1 | 11/2007 | Han et al. |
| 2007/0266503 A1 | 11/2007 | Schmidt-Forst et al. |
| 2008/0020205 A1 | 1/2008 | Fink et al. |
| 2008/0026041 A1 | 1/2008 | Tepper et al. |
| 2008/0131471 A1 | 6/2008 | Kolbe et al. |
| 2008/0149561 A1 | 6/2008 | Chu et al. |
| 2008/0154225 A1 | 6/2008 | Phan |
| 2008/0217807 A1 | 9/2008 | Lee et al. |
| 2008/0241536 A1 | 10/2008 | Luo et al. |
| 2009/0004473 A1 | 1/2009 | Luo |
| 2009/0022960 A1 | 1/2009 | Suer et al. |
| 2009/0022983 A1 | 1/2009 | Cabell et al. |
| 2009/0025894 A1 | 1/2009 | Barnholtz et al. |
| 2009/0042475 A1 | 2/2009 | Pourdeyhimi |
| 2009/0065164 A1 | 3/2009 | Goto et al. |
| 2009/0078640 A1 | 3/2009 | Chu et al. |
| 2009/0087475 A1 | 4/2009 | Sheehan |
| 2009/0123525 A1 | 5/2009 | Bedard |
| 2009/0165969 A1 | 7/2009 | Luo |
| 2009/0218056 A1 | 9/2009 | Manifold et al. |
| 2009/0218057 A1 | 9/2009 | Manifold et al. |
| 2009/0218058 A1 | 9/2009 | Manifold et al. |
| 2009/0218063 A1 | 9/2009 | Manifold et al. |
| 2009/0220731 A1 | 9/2009 | Manifold et al. |
| 2009/0220741 A1 | 9/2009 | Manifold et al. |
| 2009/0220769 A1 | 9/2009 | Manifold et al. |
| 2009/0227975 A1 | 9/2009 | Dougherty et al. |
| 2009/0232920 A1 | 9/2009 | Lozano et al. |
| 2009/0246447 A1 | 10/2009 | Luo |
| 2009/0269429 A1 | 10/2009 | Lozano et al. |

(56) References Cited

U.S. PATENT DOCUMENTS

| | | |
|---|---|---|
| 2009/0321028 A1 | 12/2009 | Takaoka et al. |
| 2009/0324926 A1 | 12/2009 | Luo |
| 2010/0044289 A1 | 2/2010 | Koslow |
| 2010/0065236 A1 | 3/2010 | Henriksson et al. |
| 2010/0187171 A1 | 7/2010 | Gupta |
| 2010/0212272 A1 | 8/2010 | Sealey et al. |
| 2010/0227519 A1 | 9/2010 | Soper et al. |
| 2010/0252510 A1 | 10/2010 | Godsay et al. |
| 2010/0314333 A1 | 12/2010 | Witsch et al. |
| 2010/0319543 A1 | 12/2010 | Witsch et al. |
| 2010/0326902 A1 | 12/2010 | Midkiff et al. |
| 2011/0114276 A1 | 5/2011 | Cordova et al. |
| 2011/0210062 A1 | 9/2011 | Wang et al. |
| 2012/0080156 A1 | 4/2012 | Laleg et al. |
| 2012/0085567 A1 | 4/2012 | Lintz et al. |
| 2012/0097032 A1 | 4/2012 | Witsch et al. |
| 2012/0132381 A1 | 5/2012 | Hentze et al. |
| 2012/0152859 A1 | 6/2012 | Battenfeld et al. |
| 2012/0160104 A1 | 6/2012 | Vulfson |
| 2013/0025806 A1 | 1/2013 | Vallery |
| 2013/0340398 A1 | 12/2013 | Battenfeld et al. |
| 2013/0341290 A1 | 12/2013 | Yu et al. |
| 2014/0166572 A1 | 6/2014 | Snyder |

FOREIGN PATENT DOCUMENTS

| | | |
|---|---|---|
| CN | 101380535 A | 3/2009 |
| EP | 0 572 569 B1 | 12/1994 |
| EP | 0 898 316 A1 | 2/1999 |
| EP | 1 493 753 A1 | 1/2005 |
| EP | 0 815 209 B1 | 1/2006 |
| EP | 1 849 896 A1 | 10/2007 |
| WO | WO 96/29397 A1 | 9/1996 |
| WO | WO 97/23669 A1 | 7/1997 |
| WO | WO 98/07911 A1 | 2/1998 |
| WO | WO 99/45875 A1 | 9/1999 |
| WO | WO 00/66820 A1 | 11/2000 |
| WO | WO 01/86043 A1 | 11/2001 |
| WO | WO 03/033806 A2 | 4/2003 |
| WO | WO 03/063996 A2 | 8/2003 |
| WO | WO 03/064006 A1 | 8/2003 |
| WO | WO 2004/026958 A1 | 4/2004 |
| WO | WO 2005/001174 A1 | 1/2005 |
| WO | WO 2005/009589 A1 | 2/2005 |
| WO | WO 2005/016208 A1 | 2/2005 |
| WO | WO 2005/017247 A2 | 2/2005 |
| WO | WO 2005/040495 A1 | 5/2005 |
| WO | WO 2005/072950 A1 | 8/2005 |
| WO | WO 2006/007020 A1 | 1/2006 |
| WO | WO 2006/083668 A3 | 8/2006 |
| WO | WO 2006/083796 A2 | 8/2006 |
| WO | WO 2007/076015 A2 | 7/2007 |
| WO | WO 2007/089230 A2 | 8/2007 |
| WO | WO 2007/112916 A1 | 10/2007 |
| WO | WO 2007/113772 A1 | 10/2007 |
| WO | WO 2007/120342 A2 | 10/2007 |
| WO | WO 2009/006206 A1 | 1/2009 |
| WO | WO 2009/006207 A1 | 1/2009 |
| WO | WO 2009/059342 A1 | 5/2009 |
| WO | WO 2009/061575 A1 | 5/2009 |
| WO | WO 2009/062009 A2 | 5/2009 |
| WO | WO 2009/088635 A2 | 7/2009 |
| WO | WO 2009/107024 A1 | 9/2009 |
| WO | WO 2009/117356 A1 | 9/2009 |
| WO | WO 2009/117361 A1 | 9/2009 |
| WO | WO 2009/117363 A1 | 9/2009 |
| WO | WO 2009/123899 A2 | 10/2009 |
| WO | WO 2010/008621 A1 | 1/2010 |
| WO | WO 2012/124652 A1 | 9/2012 |
| WO | WO 2013/132161 A2 | 9/2013 |

OTHER PUBLICATIONS

Boldizar et al., Prehydrolyzed cellulose as reinforcing filler for thermoplastics. Int J Polymeric Mat. 1987;4:229-62.

Burger et al., Nanofibrous materials and their applications. Annu. Rev. Mater. Res. 2006;36:333-68.

Chinga-Carrasco et al., Cellulose fibres, nanofibrils and microfibrils: the morphological sequence of MFC components from a plant physiology and fibre technology point of view. Nanoscale Res Lett. 2011;6:417-423.

Garcia De Rodriguez et al., Sisal cellulose whiskers reinforced polyvinyl acetate nanocomposites. Cellulose. 2006;13:261-70.

Henriksson et al., Cellulose nanopaper structures of high toughness. Biomacromolecules. 2008;9:1579-85.

Henriksson et al., Structure and properties of cellulose nanocomposite films containing melamine formaldehyde. J. Appl. Sci. 2007;106:2817-24.

Nakagaito et al., Novel high-strength bicomposites based on microfibrillated cellulose having nano-order unit web-like network structure. Appl. Phys. A. 2005;80:155-9.

Nakagaito et al., The effect of morphological changes from pulp fiber towards nano-scale fibrillated cellulose on the mechanical properties of high-strength pint fiber based composites. Appl. Phys A. 2004;78:547-52.

Nordqvist et al, Ehancement of the wet properties of transparent chitosan-acetic-acid-salt films using microfibrillated cellulose. Biomacromolec. 2007;8:2398-403.

Ragauskas et al., A nano perspective of cellulose. School of Chemistry and Biochemistry Institute of Paper Science and Technology Georgia Institute of Technology. Feb. 2007. PowerPoint. 24 pages.

Siro et al., Microfibrillated cellulose and new nanocomposite materials: a review. Cellulose. 2010;17:459-94.

Svagan et al., Biomimetic foams of high mechanical performance based on nanostructured cell walls reinforced by native cellulose nanofibrils. Adv. Mater. 2008;20:1263-9.

Svagan et al., Biomimetic polysaccharide nanocomposites of high cellulose content and high toughness. Biomacromolecules. 2007;8:2556-63.

Teague et al., Cellulose nanomaterials—come and get it! Ahead of the Curve. Dec. 12, 2012 http://www.tappi.org/content/enewsletters/ahead/2012/issues/2012-12-12.html?utm_source=Informz&utm_medium=email&utm_campaign=Email.

Zimmermann et al., Cellulose fibrils for polymer reinforcement. Adv. Eng. Mater. 2004;6(9):754-61.

International Preliminary Report on Patentability for PCT/US/2013/46744 mailed Dec. 31, 2014.

ABSORBENT AND/OR ADSORPTIVE FILTER MEDIA

RELATED APPLICATION

The present application claims priority to U.S. Provisional Application No. 61/662,309 filed on Jun. 20, 2012 and entitled "ABSORBENT AND/OR ADSORPTIVE FILTER MEDIA," which is hereby incorporated by reference in its entirety.

FIELD OF INVENTION

Aspects described herein relate generally to filter media having enhanced absorbent and/or adsorptive properties.

BACKGROUND

Filter media can be used to remove contamination in a variety of applications. Various filter media may be designed to have different performance characteristics, depending on their desired use. For example, a filter media may be designed to absorb or adsorb matter (e.g., moisture, molecules, compounds) that is present in the surrounding environment. Such filter media may be manufactured to reduce levels of humidity or particle concentration within an enclosed environment (e.g., clean rooms, isobaric cabins, disc drives, etc.).

In general, filter media can be formed as a composite of a number of materials (e.g., fibers, resin, additives, etc.). In some cases, filter media are formed as fiber webs which provide a porous structure that permits fluid (e.g., air, liquid) to flow through the filter media while absorbing or adsorbing matter contained within the fluid. Certain characteristics of the filter media, such as the type of fiber(s) and other material(s) in the overall composite, will affect filtration performance including the ability to absorb and/or adsorb surrounding matter.

SUMMARY

Filter media suitable for various applications, and related components, systems, and methods associated therewith are provided.

In an embodiment, a filter media is provided. The filter media comprises fibrillated fibers and functional particles, wherein the fibrillated fibers have a Canadian Standard Freeness level of fibrillation of between about 110 mL and about 800 mL and the functional particles comprise greater than about 25% by weight of the filter media.

In another embodiment, a filter media is provided. The filter media comprises fibrillated fibers and functional particles, wherein the functional particles comprise greater than about 25% by weight of the filter media, wherein the filter media exhibits a moisture absorption of greater than about 20% by weight after 3 hours of exposure to a moist environment.

In a further embodiment, a method of preparing a filter media is provided. The method comprises mixing a plurality of fibrillated fibers and functional particles together to form a mixture comprising fibers and particles; applying a first electrostatic charge to the mixture; adding a binder material to the mixture, the binder material having a second electrostatic charge opposite in polarity from the first electrostatic charge; and forming the filter media from the mixture.

In yet another embodiment, a method of filtration is provided. The method comprises filtering fluid using a filter media comprising fibrillated fibers and functional particles, wherein the fibrillated fibers have a Canadian Standard Freeness level of fibrillation of between about 110 mL and about 800 mL and the functional particles comprise greater than about 25% by weight of the filter media.

The foregoing is a non-limiting summary of the invention, which is defined by the attached claims. Other aspects, embodiments, features and advantages will become apparent from the following description. Each reference incorporated herein by reference is incorporated in its entirety. In cases of conflict or inconsistency between an incorporated reference and the present specification, the present specification will control.

BRIEF DESCRIPTION OF THE DRAWINGS

The accompanying drawings are not intended to be drawn to scale. For purposes of clarity, not every component may be labeled in every drawing. In the drawings.

DETAILED DESCRIPTION

Figure 1:
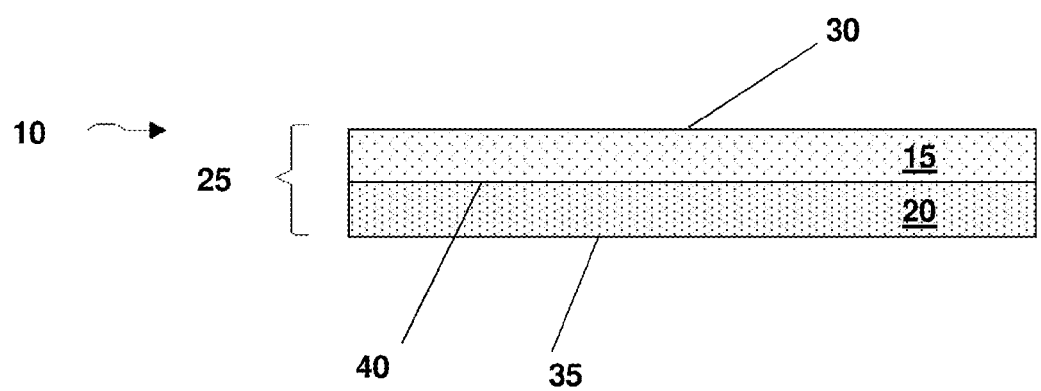
FIG. 1 is a schematic diagram showing a filter media in accordance with one or more embodiments.

Filter media and related components, systems, and methods associated therewith are described. Filter media described herein may be formed as a composite structure that exhibits enhanced absorption and/or adsorption characteristics (e.g., fast absorption/adsorption kinetics, increased capacity to absorb/adsorb) while also having a suitable level of air permeability (e.g., greater than 1.5 cfm/sf). For instance, the filter media may be well-suited to absorb and/or adsorb (or capture) organic and inorganic molecules that are present within a surrounding environment.

The filter media include a number of components. In particular, the filter media may include fibrillated fibers (e.g., fibrillated regenerated cellulose fibers, lyocell fibers, fibrillated aramid fibers), which exhibit a certain level of fibrillation, and functional particles (e.g., activated carbon particles). Functional particles may have compositional and/or structural characteristics that permit the particles to readily absorb and/or adsorb certain types of matter from the surrounding environment. The relative amounts of fibrillated fibers and functional particles included in the filter media, along with the level of fibrillation of the fibers, may be suitably balanced so as to give rise to a filter media having enhanced absorption and/or adsorption properties, while also maintaining a suitable degree of air permeability.

The filter media may provide advantages by increasing the useful life of certain equipment, for example, by assisting in cleaning, and maintaining the surrounding environment within suitable moisture/humidity and/or particle concentration levels. While the filter media may be particularly well-suited for applications that involve absorption and/or adsorption, the filter media may also be used in other applications.

As noted above, the filter media includes fibrillated fibers (e.g., lyocell, aramid). As known to those of ordinary skill in the art, a fibrillated fiber includes a parent fiber that branches into smaller diameter fibrils which can, in some instances, branch further out into even smaller diameter fibrils with further branching also being possible. The branched nature of the fibrils lead to a filter media having a high surface area and can increase the number of contact points between the fibrillated fibers and other fibers or particles in the media. Such an increase in points of contact between the fibrillated fibers and other fibers or components of the filter media (e.g., functional particles) may provide reinforcement for the media contributing to enhancement of mechanical properties (e.g., flexibility, strength) and/or performance properties of the filter media. In some embodiments, the fibrillated nature of the fibers may enhance structural integrity of the filter media by suitably retaining functional particles within the porous structure.

A fibrillated fiber may be formed of any suitable materials such as synthetic materials (e.g., synthetic polymers such as polyester, polyamide, polyaramid, polyimide, polyethylene, polypropylene, polyether ether ketone, polyethylene terephthalate, polyolefin, nylon, acrylics, regenerated cellulose (e.g., lyocell, rayon), poly p-phenylene-2,6-bezobisoxazole (PBO), and natural materials (e.g., natural polymers such as cellulose (e.g., non-regenerated cellulose)). In some embodiments, organic polymer fibers are used.

In some embodiments, fibrillated fibers may be synthetic fibers. Synthetic fibers as used herein, are non-naturally occurring fibers formed of polymeric material. Fibrillated fibers may also be non-synthetic fibers, for example, cellulose fibers that are naturally occurring. It can be appreciated that fibrillated fibers may include any suitable combination of synthetic and/or non-synthetic fibers.

In general, the fibrillated fibers may fall within any suitable level of fibrillation range. The level of fibrillation relates to the extent of branching in the fibers. The level of fibrillation may be measured according to any number of suitable methods.

For example, the level of fibrillation of the fibrillated fibers can be measured according to a Canadian Standard Freeness (CSF) test, specified by TAPPI test method T 227 om 09 Freeness of pulp. As determined by the CSF test, a smaller value of volume measured denotes a greater level of fibrillation. In some embodiments, the average CSF value of the fibrillated fibers may be greater than about 45 mL, greater than about 50 mL, greater than about 70 mL, greater than about 100 mL, greater than about 110 mL, greater than about 120 mL, greater than about 150 mL, greater than about 200 mL, greater than about 250 mL, or greater than about 300 mL. In some embodiments, the average CSF value of the fibrillated fibers may be less than about 850 mL, less than about 800 mL, less than about 750 mL, less than about 700 mL, less than about 650 mL, less than about 600 mL, less than about 500 mL or less than about 450 mL. It can be appreciated that the CSF level of fibrillation of the fibrillated fibers may be between any of the above-noted lower limits and upper limits. For example, the fibrillated fibers may exhibit an average CSF value of between about 45 mL and about 850 mL, between about 50 mL and about 400 mL, between about 100 mL and about 400 mL, between about 100 mL and about 600 mL, between about 110 mL and about 600 mL, between about 120 mL and about 600 mL, between about 150 mL and about 600 mL, between about 150 mL and about 500 mL, between about 200 mL and about 400 mL, between about 200 mL and about 350 mL, between about 300 mL and about 400 mL, or between about 250 mL and about 350 mL (e.g., 300 mL).

In some embodiments, the level of fibrillation of the fibrillated fibers can be measured according to a Schopper Riegler (SR) test, specified by ISO 5267/1. As determined by the SR test, the larger the value of degrees measured, the greater the level of fibrillation. In some embodiments, the average SR value of the fibrillated fibers may be greater than about 30° SR, greater than about 50° SR, greater than about 60° SR, greater than about 65° SR. Alternatively, the average SR value of the fibrillated fibers may be less than about 100° SR, less than about 90° SR, less than about 80° SR, or less than about 70° SR. It should be understood that the SR value of fibrillation of the fibrillated fibers may be between any of the above-noted lower limits and upper limits. For example, the fibrillated fibers may exhibit an average SR value of between about 30 and about 100° SR, between about 50° SR and about 100° SR, between about 60° SR and about 95° SR, between about 60° SR and about 80° SR, or between about 65° SR and about 75° SR.

It should be understood that, in certain embodiments, the fibers may have fibrillation levels outside the above-noted ranges.

As noted above, a greater level of fibrillation of the fibers may work to provide structural integrity to the filter media, despite relatively high amounts of functional particles being present within the filter media. However, depending on the application, it may be preferable to maintain the level of fibrillation of the fibers to within a preferred range, so that the filter media exhibits a desirable degree of air permeability. Additionally, the level of fibrillation of the fibers within the filter media may be suitably maintained within a preferred range to allow for more functional particles to be both present and effective within the filter media. In other words, overly fibrillated fibers may have a tendency to suppress the absorbent and/or adsorptive properties of the filter media, in certain embodiments. Thus, it can be appreciated that, for filter media described herein, the percentage and properties of functional particles incorporated within the filter media may be balanced with the level of fibrillation of the fibers and the relative amount of the fibers to achieve desired performance and mechanical characteristics.

In certain preferred embodiments, the fibrillated fibers are formed of lyocell. Lyocell fibers are known to those of skill in the art as a type of synthetic fiber and may be produced from regenerated cellulose by solvent spinning.

In certain embodiments, the fibrillated fibers are formed of rayon. Rayon fibers are also produced from regenerated cellulose and may be produced using an acetate method, a cuprammonium method, or a viscose process. In these methods, the cellulose or cellulose solution may be spun to form fibers.

Fibers may be fibrillated through any appropriate fibrillation refinement process. In some embodiments, fibers (e.g., lyocell fibers) are fibrillated using a disc refiner, a stock beater or any other suitable fibrillating equipment.

In certain embodiments, the fibrillated fibers may have compositions other than those described above. For example, suitable compositions may include acrylic, liquid crystalline polymers, polyoxazole (e.g., poly(p-phenylene-2,6-benzobisoxazole)), aramid, paramid, cellulose wood, cellulose non-wood, cotton, polyethylene, polyolefin and olefin, amongst others.

In general, the fibrillated fibers may have any suitable dimensions.

As noted above, fibrillated fibers include parent fibers and fibrils. The parent fibers may have an average diameter of less than about 75 microns; in some embodiments, less than about 60 microns; in some embodiments, less than about 50 microns; in some embodiments, less than about 40 microns; in some embodiments, less than about 30 microns; in some embodiments, less than about 20 microns; and in some embodiments, less than about 15 microns. For example, the parent fibers may have a diameter of between about 1 micron and about 100 microns, between about 5 microns and about 90 microns, between about 10 microns and about 80 microns, between about 20 microns and about 70 microns, between about 30 microns and about 60 microns, or between about 40 microns and about 50 microns. The fibrils may have an average diameter of less than about 15 microns; in some embodiments, less than about 12 microns; in some embodiments, less than about 10 microns; in some embodiments, less than about 6 microns; in some embodiments, less than about 4 microns; in some embodiments, less than about 3 microns; and in some embodiments, less than about 1 micron. For example, the fibrils may have a diameter of between about 0.1 microns and about 10 microns, between about 1 micron and about 8 microns, between about 3 microns and about 7 microns, between about 4 microns and about 6 microns, between about 0.1 microns and about 6 microns, between about 0.1 microns and about 2 microns, between about 0.1 microns and about 1.5 microns, or between about 0.3 microns and about 0.7 microns.

The fibrillated fibers described may have an average length of less than about 15 mm, less than about 12 mm, less than about 10 mm, less than about 6 mm, less than about 5 mm, less than about 4 mm, less than about 3 mm, less than about 2 mm, or less than about 1 mm. For example, the average length of the fibrillated fibers may be between about 0.1 and about 15 mm, between about 1 and about 10 mm, between about 3 and about 8 mm, between about 4 and about 6 mm, between about 1 and about 5 mm, between about 2 mm and about 4 mm, between about 0.1 and about 2 mm, between about 0.1 and about 1.2 mm, or between about 0.8 mm and about 1.1 mm. The average length of the fibrillated fibers refers to the average length of parent fibers from one end to an opposite end of the parent fibers. In some embodiments, the maximum average length of the fibrillated fibers fall within the above-noted ranges. The maximum average length refers to the average of the maximum dimension along one axis of the fibrillated fibers (including parent fibers and fibrils).

It should be understood that, in certain embodiments, the fibers and fibrils may have dimensions outside the above-noted ranges.

In general, the filter media may include any suitable weight percentage of fibrillated fibers to achieve the desired balance of properties. In some embodiments, the fibrillated fibers make up greater than about 1% by weight of the filter media, greater than about 5% by weight of the filter media, greater than about 7% by weight of the filter media, greater than about 10% by weight of the filter media, greater than about 20% by weight of the filter media, greater than about 30% by weight of the filter media, or greater than about 40% by weight of the filter media. In some embodiments, the fibrillated fibers make up less than about 50% by weight of the filter media, less than about 40% by weight of the filter media, less than about 30% by weight of the filter media, less than about 20% by weight of the filter media, less than about 12% by weight of the filter media, less than about 10% by weight of the filter media, or less than about 5% by weight of the filter media. It should be understood that the weight percentage of fibrillated fibers in the filter media may be between any of the suitable above-noted lower limits and upper limits. For example, the fibrillated fibers may comprise between about 1% and about 50% by weight of the filter media; in some embodiments, between about 4% and about 50% by weight of the filter media; in some embodiments, between about 4% and about 40% by weight of the filter media; in some embodiments, between about 5% and about 30% by weight of the filter media; in some embodiments, between about 5% and about 20% by weight of the filter media; in some embodiments, between about 10% and about 20% by weight of the filter media; in some embodiments, between about 10% and about 30% by weight of the filter media; in some embodiments, between about 5% and about 15% by weight of the filter media; in some embodiments, between about 5% and about 10% by weight of the filter media; in some embodiments, between about 10% and about 15% by weight of the filter media; in some embodiments, between about 5% and about 15% by weight of the filter media.

In some embodiments, filter media having an appropriate amount of fibrillated fibers having a suitable level of fibrillation may exhibit a comparatively greater degree of flexibility, strength, and ability to retain functional particles than other comparable filter media that have a smaller percentage of fibrillated fibers or no fibrillated fibers.

The filter media includes functional particles which, as noted above, have a relatively high surface area. In some embodiments, the functional particles are particles that are processed (e.g., subjected to pyrolysis, high pressure, heat, etc.) to achieve the high surface areas. In some cases, functional particles may be porous or may include tortuous channel-like or plate-like structures.

In general, functional particles are incorporated within the overall filter media composite structure through suitable bonding or adherence. For example, fibrillated fibers of the filter media may retain functional particles within the media by van der Waals forces or hydrogen bonds.

The functional particles can impart the filter media with enhanced absorption and/or adsorption characteristics, for example, due to the increased surface area. In some embodiments, functional particles may be effective to remove water or small matter (e.g., organic/inorganic molecules, compounds) from the surrounding environment, such as through removal or entrapment of molecules/particles within pores or channels. Accordingly, the water or small matter concentration in the surrounding environment may be reduced. In some cases, functional particles may assist in removing odors from an enclosed space.

Functional particles incorporated within the filter media may be obtained from any suitable source material. In some embodiments, functional particles are activated carbon, which may be derived from carbonaceous materials, such as coconut shells, nutshells, bone char, peat, coir, wood, lignite, anthracite, coal (e.g., bituminous coal) and petroleum. Functional particles may be derived from extruded carbon blocks, activated carbon foams, impregnated woven cloths, impregnated nonwoven materials, activated carbon fibers, spherical adsorbents or other appropriate materials. Functional particles may also be derived from non-carbonaceous materials, such as diatomaceous earth, zeolites, perlite, vermiculite, clay, metal powders, metal oxide powders, calcium salts (e.g., sulfates), oxides, alumina or any other material that has a tendency to absorb and/or adsorb surrounding matter (e.g., moisture, organic molecules, small particles). In addition, functional particles may comprise a combination of materials (e.g., a selection of materials described above) that are blended together. In some embodiments, functional particles may be fibrous in nature, for example, activated carbon fibers.

The functional particles of the filter media may fall within any suitable average particle size range. The size of the functional particles may relate directly or indirectly to the level of absorption and/or adsorption exhibited by the filter media.

Though, it is possible for functional particles that have a relatively large average particle size to also exhibit a large surface area (e.g., due to porosity and channels). As noted above, filter media having functional particles with larger surface areas may give rise to greater levels of absorption and/or adsorption than would filter media having functional particles with comparatively smaller surface areas.

As determined herein, particle size is measured in accordance with ASTM C136-06 for particles above 75 microns and ASTM C117 for particles below 75 microns. The functional particles may have an average particle size that falls within a certain range so that the filter media exhibits a suitable degree of permeability (e.g., due to a sufficient amount of space/pores for fluid to travel through the filter media) while still exhibiting enhanced properties of absorption and/or adsorption (e.g., due to the increased surface area of the functional particles). In some embodiments, the functional particles may have an average particle size of between about 1 micron and about 500 microns, between about 5 microns and about 450 microns, between about 10 microns and about 450 microns, between about 15 microns and about 420 microns, between about 20 microns and about 350 microns, between about 30 microns and about 420 microns, between about 30 microns and about 350 microns, between about 35 microns and about 300 microns, between about 200 microns and about 450 microns, between about 250 microns and about 400 microns, between about 250 microns and about 350 microns, between about 50 microns and about 300 microns, between about 100 microns and about 200 microns, between about 5 microns and about 100 microns, between about 10 microns and about 100 microns, between about 50 microns and about 90 microns, between about 60 microns and about 80 microns, between about 70 microns and about 80 microns, between about 10 microns and about 90 microns, between about 10 microns and about 75 microns, between about 10 microns and about 60 microns, between about 10 microns and about 50 microns, between about 20 microns and about 75 microns, between about 20 microns and about 50 microns, or between about 20 microns and about 40 microns. The particle size of the functional particles may fall within a suitable distribution (e.g., unimodal, bimodal, trimodal). For instance, the functional particles may have a bimodal distribution of particle size (e.g., with one peak above 75 microns and another peak below 75 microns).

The functional particles of the filter media may exhibit a suitable surface area. As determined herein, surface area is measured through use of a BET analysis conducted in accordance with ASTM D3663-03 (2008) Standard Test Method for Surface Area of Catalysts and Catalyst Carriers. In some embodiments, the average surface area of the functional particles may be greater than about 500 $m^2/g$, greater than about 700 $m^2/g$, greater than about 900 $m^2/g$, greater than about 1200 $m^2/g$, greater than about 1500 $m^2/g$, or greater than about 2000 $m^2/g$. For instance, the functional particles may have a surface area between about 700 $m^2/g$ and about 2500 $m^2/g$, between about 900 $m^2/g$ and about 2500 $m^2/g$, between about 1200 $m^2/g$ and about 2500 $m^2/g$, between about 1500 $m^2/g$ and about 2500 $m^2/g$, between about 1800 $m^2/g$ and about 2500 $m^2/g$, between about 2000 $m^2/g$ and about 2500 $m^2/g$, or between about 2000 $m^2/g$ and about 2400 $m^2/g$.

In general, the filter media may include any suitable weight percentage of functional particles to achieve an appropriate balance of properties. In some embodiments, the functional particles make up greater than about 25% by weight of the filter media, greater than about 50% by weight of the filter media, greater than about 60% by weight of the filter media, greater than about 70% by weight of the filter media, greater than about 80% by weight of the filter media, greater than about 90% by weight of the filter media, or greater than about 95% by weight of the filter media. In some embodiments, the functional particles make up less than about 95%, less than about 90%, less than about 85%, less than about 80%, less than about 70%, less than about 60%, less than about 50%, or less than about 40% by weight of the filter media. It should be understood that the weight percentage of the functional particles in the filter media may be between any of the above-noted lower limits and upper limits. For example, the filter media may comprise between about 50% and about 95% by weight of the filter media; in some embodiments, between about 70% and about 95% by weight of the filter media; in some embodiments, between about 75% and about 90% by weight of the filter media; in some embodiments, between about 70% and about 90% by weight of the filter media; in some embodiments, between about 75% and about 80% by weight of the filter media; in some embodiments, between about 80% and about 90% by weight of the filter media; and, in some embodiments, between about 80% and about 85% by weight of the filter media, between about 85% and about 90% by weight of the filter media, or between about 90% and about 95% by weight of the filter media. In some embodiments, filter media having an amount of functional particles that is greater than that of other filter media may exhibit a comparatively greater degree of absorption and/or adsorption of organic and inorganic molecules from the surrounding environment.

A binder resin may be incorporated into the filter media, typically comprising a relatively small weight percentage of the filter media. The binder resin, herein, is not in fiber form and is to be distinguished from binder fibers (e.g., bi-component, multi-component fibers).

In some embodiments, the binder resin may have an electrostatic charge that is opposite that of the charge imparted to the fibrillated fibers and functional particles by the ionic agent. Accordingly, during a wet laid process, the binder resin may be added to the suspension of fibrillated fibers and functional particles, which has a net charge. Upon addition, the binder resin may coat the fibrillated fibers and functional particles such that the mixture further adheres and agglomerates together. As discussed further below, the aggregate of fibrillated fibers and functional particles may be gathered and appropriately formed into a filter media.

In general, a binder resin may have any suitable composition. The binder resin may comprise a thermoplastic, a thermoset, or a combination thereof. For example, the binder material may include acrylic, latex emulsion, nitrile, styrene, styrene-acrylic, polyolefin, polyvinyl halide, polyvinyl ester, polyvinyl ether, polyvinyl sulfate, polyvinyl phosphate, polyvinyl amine, polyamide, polyimide, polyoxidiazole, polytriazol, polycarbodiimide, polysulfone, polycarbonate, polyether, polyarylene oxide, polyester, polyarylate, phenol-formaldehyde resin, melamine-formaldehyde resin, formaldehyde-urea, ethyl-vinyl acetate copolymer, or other suitable compositions. The binder resin may be anionic, cationic, or non-ionic in nature.

In some embodiments, the binder resin may comprise less than about 20%, less than about 15%, less than about 10%, or less than about 5% by weight of the filter media. For example, the binder resin may comprise between about 1% and about 20%, between about 3% and about 15%, or between about 4% and about 7% by weight of the filter media. The filter media may include binder resin outside of the above noted ranges.

In addition to fibrillated fibers, the filter media may include non-fibrillated fibers. In some embodiments, the non-fibrillated fibers are synthetic fibers; and, in other embodiments, the non-fibrillated fibers are non-synthetic fibers. Non-fibrillated fibers of the filter media may include any suitable type of synthetic fiber or non-synthetic fiber. Examples of suitable non-fibrillated fibers include polyester, polyamide, polyaramid, polyimide, polyethylene, polypropylene, polyether ether ketone, polyethylene terephthalate, polyolefin, nylon, unfibrillated aramid, mineral wool fibers, basalt fibers, and glass fibers (e.g., microglass, chopped strand). In some cases, the non-fibrillated fibers are mono-component fibers; while in other cases, the non-fibrillated fibers are multi-component fibers (e.g., bi-component fibers). It should be understood that other types of synthetic or naturally occurring fibers may also be used.

The filter media may include a suitable percentage of non-fibrillated fibers. In some embodiments, the weight percentage of the non-fibrillated fibers in the filter media is less than about 20%, less than about 10%, less than about 5%, less than about 3%, or less than about 1%. In some embodiments, non-fibrillated fibers make up between about 0.1% and about 20%, between about 0.5% and about 10%, or between about 1% and about 5% by weight of the filter media. It can be appreciated that it may also be possible for non-fibrillated fibers to be incorporated within the filter media outside of the ranges disclosed.

In some embodiments, non-fibrillated fibers may be staple fibers, for example, synthetic fibers that are cut to a suitable average length and are appropriate for incorporation into a wet-laid or dry-laid process for forming a filter media. In some cases, groups of staple fibers may be cut to have a particular length with only slight variation in length between individual fibers.

In some embodiments, non-fibrillated fibers may be binder fibers. The binder fibers may be mono-component or multi-component fibers. An example of a multi-component fiber is a bi-component fiber which includes a first material and a second material that is different from the first material. The different components of a multi-component fiber may exhibit a variety of spatial arrangements. For example, multi-component fibers may be arranged in a core-sheath configuration (e.g., a first material may be a sheath material that surrounds a second material which is a core material), a side by side configuration (e.g., a first material may be arranged adjacent to a second material), a segmented pie arrangement (e.g., different materials may be arranged adjacent to one another in a wedged configuration), a tri-lobal arrangement (e.g., a tip of a lobe may have a material different from the lobe) and an arrangement of localized regions of one component in a different component (e.g., "islands in sea").

It should be understood that the filter media may, or may not, include other components in addition to those described above. Typically, any additional components are present in limited amounts, e.g., less than 5% by weight. For example, in some embodiments, the filter media may include wet strength additives, phenolic compositions, antimicrobial agents, flame retardant agents, silicone, pigments, surfactants, coupling agents, crosslinking agents, and/or conductive additives, amongst others.

The filter media may have a variety of desirable properties and characteristics. For example, the filter media described herein may have varying basis weight, pore size, thickness, porosity, surface area, depending upon the requirements of a desired application.

The basis weight of the filter media can vary depending on factors such as the absorption and adsorption requirements of a given filtering application, the materials used to form the filter media, and the desired level of air permeability of the filter media.

In some embodiments, the overall basis weight of the filter media may range from between about 100 and about 1000 g/m$^2$, between about 150 and about 750 g/m$^2$, between about 200 and about 700 g/m$^2$, between about 250 and about 650 g/m$^2$, between about 300 and about 600 g/m$^2$, between about 400 and about 600 g/m$^2$, between about 500 and about 700 g/m$^2$, or between about 550 and about 600 g/m$^2$. As determined herein, the basis weight of the filter media is measured according to TAPPI 410.

Thickness, as referred to herein, is determined according to TAPPI 411. The overall thickness of the filter media may be between about 0.1 mm and about 10.0 mm, between about 0.2 mm and about 5.0 mm, between about 0.5 mm and about 3.0 mm, between about 1.0 mm and about 2.5 mm, between about 1.5 mm and about 2.5 mm, or between about 1.7 mm and about 2.1 mm.

Density is determined based on the weight of the filter media divided by the volume measured. The density of the filter media may be between about 5 g/cm$^3$ and about 60 g/cm$^3$, between about 10 g/cm$^3$ and about 50 g/cm$^3$, between about 25 g/cm$^3$ and about 45 g/cm$^3$, between about 25 g/cm$^3$ and about 40 g/cm$^3$, or between about 28 g/cm$^3$ and about 34 g/cm$^3$.

The filter media may exhibit a suitable surface area. Similar to that discussed above regarding the functional particles, the surface area of the filter media is measured in accordance with ASTM D3663-03 (2008) Standard Test Method for Surface Area of Catalysts and Catalyst Carriers. In some embodiments, the surface area of the filter media may be greater than about 500 m$^2$/g, greater than about 700 m$^2$/g, greater than about 900 m$^2$/g, greater than about 1200 m$^2$/g, greater than about 1500 m$^2$/g, or greater than about 2000 m$^2$/g. For instance, the filter media may have a surface area between about 700 m$^2$/g and about 2500 m$^2$/g, between about 700 m$^2$/g and about 2200 m$^2$/g, between about 900 m$^2$/g and about 2500 m$^2$/g, between about 1200 m$^2$/g and about 2500 m$^2$/g, between about 1500 m$^2$/g and about 2500 m$^2$/g, between about 1800 m$^2$/g and about 2500 m$^2$/g, between about 2000 m$^2$/g and about 2500 m$^2$/g, between about 2000 m$^2$/g and about 2400 m$^2$/g, or between about 1800 m$^2$/g and about 2100 m$^2$/g.

The filter media may have a suitable mean flow pore size. The mean flow pore size, as determined herein, is measured according to ASTM F316. In some embodiments, the filter media may have a mean flow pore size of between about 1 micron and about 10 microns, between about 2 microns and about 6 microns, or between about 4 microns and about 5.5 microns. The pore sizes of a filter media may fall within a suitable distribution (e.g., unimodal, bimodal, trimodal). In some embodiments, the pore sizes of a filter media exhibit a bimodal distribution. For example, relatively smaller pores of the filter media may fall within an average pore size range of between about 0.1 micron and about 5 microns, between about 0.2 microns and about 2 microns, between about 0.5 microns and about 1 micron, or between about 0.5 microns and about 0.8 microns. Alternatively, relatively larger pores of the filter media may fall within an average pore size range of between about 10 microns and about 50 microns, between about 15 microns and about 45 microns, between about 20 microns and about 40 microns, or between about 25 microns and about 35 microns.

The filter media described herein may have a single layer, or multiple layers. In some embodiments involving multiple layers, a clear demarcation of layers may not always be apparent, as described in more detail below. An example of a filter media is shown in FIG. 1. As shown illustratively in FIG. 1, a filter media 10 includes a first layer 15 and a second layer 20 having a combined thickness 25. Optionally, the filter media may include additional layers (not shown).

The first layer may be positioned upstream or downstream of the second layer in a filter element. In some embodiments, one or more of the layers of the filter media are fiber webs. In some embodiments, one or more of the layers of the filter media include a composite formed of fibrillated fibers and functional particles.

In some embodiments, filter media 10 includes a clear demarcation between the first and second layers. For example, the filter media may include an interface 40 between the two layers that is distinct. In some such embodiments, the first and second layers may be formed separately, and combined by any suitable method such as lamination, collation, or by use of adhesives. The first and second layers may be formed using different processes, or the same process. For example, each of the first and second layers may be independently formed by a wet laid process, a dry laid process, a spinning process, a meltblown process, or any other suitable process.

In other embodiments, filter media 10 does not include a clear demarcation between the first and second layers. For example, a distinct interface between the two layers may not be apparent. In some cases, the layers forming a filter media may be indistinguishable from one another across the thickness of the filter media. The first and second layers may be formed by the same process (e.g., a wet laid process, a dry laid process, a spinning process, a meltblown process, or any other suitable process) or by different processes. In some instances, the first and second layers may be formed simultaneously.

Regardless of whether a clear demarcation between first and second layers is present, in some embodiments, filter media 10 includes a gradient (i.e., a change) in one or more properties such as fiber diameter, fiber type, fiber composition, fiber length, level of fibrillation, fiber surface chemistry, particle size, particle surface area, particle composition, pore size, material density, basis weight, solidity, a proportion of a component (e.g., a binder, resin, crosslinker), stiffness, tensile strength, wicking ability, hydrophilicity/hydrophobicity, and conductivity across a portion, or all of, the thickness of the filter media. The filter media may optionally include a gradient in one or more performance characteristics such as absorbance (e.g., moisture absorption), adsorption (e.g., TMP adsorption), efficiency, dust holding capacity, pressure drop, air permeability, and porosity across the thickness of the filter media. A gradient in one or more such properties may be present in the filter media between a top surface 30 and a bottom surface 35 of the filter media.

Different types and configurations of gradients are possible within a filter media. In some embodiments, a gradient in one or more properties is gradual (e.g., linear, curvilinear) between a top surface and a bottom surface of the filter media. For example, the filter media may have an increasing amount of fibrillated fibers or functional particles from the top surface to the bottom surface of the filter media. In another embodiment, a filter media may include a step gradient in one or more properties across the thickness of the filter media. In one such embodiment, the transition in the property may occur primarily at an interface 40 between the two layers. For example, a filter media, e.g., having a first layer including a first fiber or functional particle type and a second layer including a second fiber or functional particle type, may have an abrupt transition between fiber or functional particle types across the interface. In other words, each of the layers of the filter media may be relatively distinct. Other types of gradients are also possible.

In certain embodiments, a filter media may include a gradient in one or more properties through portions of the thickness of the filter media. In the portions of the filter media where the gradient in the property is not present, the property may be substantially constant through that portion of the media. As described herein, in some instances a gradient in a property involves different proportions of a component (e.g., a type of fiber, a functional particle, an additive, a binder) across the thickness of a filter media. In some embodiments, a component may be present at an amount or a concentration that is different than another portion of the filter media. In other embodiments, a component is present in one portion of the filter media, but is absent in another portion of the filter media. Other configurations are also possible.

In some embodiments, a filter media has a gradient in one or more properties in two or more regions of the filter media. For example, a filter media having three layers may have a first gradient in one property across the first and second layer, and a second gradient in another property across the second and third layers. The first and second gradients may be the same in some embodiments, or different in other embodiments (e.g., characterized by a gradual vs. an abrupt change in a property across the thickness of the filter media). Other configurations are also possible.

A filter media may include any suitable number of layers, e.g., at least 2, 3, 4, 5, 6, 7, 8, or 9 layers depending on the particular application and performance characteristics desired. It should be appreciated that in some embodiments, the layers forming a filter media may be indistinguishable from one another across the thickness of the filter media. As such, a filter media formed from, for example, two "layers" or two "fibrillated fiber and functional particle mixtures" can also be characterized as having a single "layer" (or a composite layer) having a gradient in a property across the filter media in some instances.

Filter media described herein may be used in an overall filtration arrangement or filter element. In some embodiments, additional layers or components are included with the filter media (e.g., disposed adjacent to the filter media, contacting one or both sides of the filter media) in a filter element. The filter media may also be used alone, or in combination with another filtration layer. For example, the filter media may be provided in a filtration arrangement with one or more additional layers, such as a fiber web or scrim which may be formed by any suitable method (e.g., wet laid, dry laid, spunbond, electrospun, melt-blown, etc.). The additional layer(s) may be formed of any suitable material using any appropriate method.

As described herein, in some embodiments two or more layers of a filter media may be formed separately, and combined by any suitable method such as lamination, collation, or by use of adhesives. The two or more layers may be formed using different processes, or the same process, for example, as a fiber web. For instance, each of the layers may be independently formed by a wet laid process, a dry laid process, a spinning process, a meltblown process, or any other suitable process.

In some embodiments, two or more layers may be formed by the same process (e.g., a wet laid process, a dry laid process, a spinning process, a meltblown process, or any other suitable process). In some instances, the two or more layers may be formed simultaneously. In some embodiments, a gradient in at least one property may be present across the thickness of the two or more layers.

When a layer of the filter media, or an additional layer, is used as a meltblown layer, it may be a meltblown layer as described, for example, in commonly-owned U.S. Patent Publication No. 2009/0120048 which is based on U.S. patent application Ser. No. 12/266,892, filed on May 14, 2009; or commonly-owned U.S. Patent Publication No. 2012/0152824 which is based on U.S. patent application Ser. No. 12/971,539, filed on Dec. 17, 2010, both of which are incorporated herein by reference in their entirety. Fibers of the one or more additional filtration layers may have any suitable dimensions (e.g., diameter, length). The additional filtration layers may have any suitable basis weight, thickness, mean flow pore size, percentage of fibrillated fibers, average level of fibrillation, percentage of non-fibrillated fibers, etc.

Additional layers may include fiber webs having synthetic or naturally occurring fibers. When synthetic fibers are used, suitable thermoplastic polymeric materials may be selected. Exemplary polymer materials include polyolefins (e.g., polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes). Optionally, the polymer(s) may contain fluorine atoms. Examples of such polymers include PVDF and PTFE.

Different layers may be adhered together by any suitable method. For instance, layers may be adhered by an adhesive or melt-bonded to one another on either side. In some embodiments, an additional layer may be formed from any type of fiber or blend of fiber and functional particles via an added headbox or a coater and appropriately adhered another layer.

As noted above, the filter media may be adhered to a scrim. As discussed further below, in some embodiments, during manufacture, the filter media is formed directly on to a scrim upon exiting a headbox, and is subsequently dried for further processing. In other embodiments, the filter media may be formed on a wire without a scrim and optionally adhered to a scrim at a later time.

Any suitable scrim may be used as a backing for the filter media. For instance, a scrim may be wet laid or dry laid, woven or nonwoven, and formed of any suitable combination of materials. For example, the scrim may include polyester, polyamide, polyimide, polyethylene, polypropylene, polyethylene terephthalate, polyolefin, or any other suitable material. In some embodiments, a scrim includes a dry laid nonwoven fabric that exhibits a high level of air permeability. In some embodiments, the scrim includes a low melting point adhesive located on one side to facilitate bonding of the scrim to the filter media, or bonding of the scrim to a precursor of the filter media (e.g., an aggregate of fibrillated fibers and functional particles).

The scrim may have a suitable weight and thickness. In some embodiments, the scrim may have a basis weight of between about 1 $g/m^2$ and about 200 $g/m^2$, between about 5 $g/m^2$ and about 100 $g/m^2$, between about 10 $g/m^2$ and about 50 $g/m^2$, or between about 16 $g/m^2$ and about 40 $g/m^2$. In some embodiments, the scrim may have a thickness of between about 0.01 mm and about 1.0 mm, between about 0.02 mm and about 0.5 mm, or between about 0.05 mm and about 0.1 mm.

The scrim may exhibit a suitable level of air permeability. In some embodiments, the scrim may exhibit an air permeability of between about 10 cfm/sf and about 300 cfm/sf, between about 50 cfm/sf and about 280 cfm/sf, or between about 80 cfm/sf and about 250 cfm/sf.

In some embodiments, it may be preferable for the filter media to exhibit certain mechanical properties. For example, as described above, forming a filter media composed primarily of fibrillated fibers and functional particles or forming another filtration composite (e.g., fiber web) having high surface area may give rise to a filter media having enhanced absorption and/or adsorption capabilities. In some embodiments, filter media described herein, despite being composed primarily of functional particles rather than fibers, may exhibit an appropriate level of tensile strength.

The tensile strength properties of the filter media may appropriately vary. In some embodiments, the filter media may have a tensile strength in the machine direction of between about 1 lb/inch and about 50 lb/inch, between about 5 lb/inch and about 20 lb/inch, or between about 12 lb/inch and about 16 lb/inch. Tensile strength is measured in accordance with TAPPI 494.

The degree to which the filter media is adhered to the scrim may vary appropriately. The degree of adhesion between the scrim and the filter media may be assessed in accordance with ASTM D2724. It is determined that the degree of adhesion between the scrim and the filter media is sufficient when, upon peeling apart of the scrim and the filter media, the undersurface of the scrim having contacted the filter media is covered uniformly with functional particles. In some embodiments, the degree of adhesion between the scrim and the filter media, where the undersurface of the scrim is covered uniformly with functional particles upon peeling apart of the scrim and the filter media, is greater than about 1 ounce/2 inches, greater than about 3 ounces/2 inches, greater than about 5 ounces/2 inches, greater than about 7 ounces/2 inches, or greater than about 9 ounces/2 inches. For example, the degree of adhesion between the scrim and the filter media may be between about 1 ounce/2 inches and about 10 ounces/2 inches, between about 2 ounces/2 inches and about 8 ounces/2 inches, or between about 3 ounces/2 inches and about 5 ounces/2 inches (e.g., approximately 4 ounces/2 inches).

The filter media described herein may also exhibit advantageous filtration performance characteristics, such as air permeability, moisture absorption and adsorption, amongst others.

The level of fibrillation of the fibrillated fibers may affect the air permeability as well as absorptive/adsorptive characteristics of the filter media. As noted above, it is contemplated that the greater the level of fibrillation of the fibers within the filter media, the more contact points may arise between the fibers and functional particles, resulting in a filter media with enhanced structural integrity. However, a suitable balance in the level of fibrillation may be appropriate. For instance, fibers of the filter media that have an extremely high level of fibrillation may have a tendency to block pores of the functional particles, resulting in an overall decrease in absorption and/or adsorption characteristics of the filter media, as well as air permeability. Accordingly, filter media described herein may be prepared so as to have appropriate ranges of composition (e.g., level of fibrillation, amount of fibrillated fibers, amount of functional particles, surface area of the fibers/particles, etc.) where the filter media has a desirable structural integrity while at the same time exhibits favorable properties in permeability, absorption and/or adsorption.

The filter media may exhibit suitable air permeability characteristics. As determined herein, the permeability is measured according to ASTM D737 with a Frazier Permeability Tester. In some embodiments, the air permeability of the filter media may be greater than about 0.1 cubic feet per minute per square foot (cfm/sf), greater than about 0.5 cfm/sf, greater than about 1.0 cfm/sf, greater than about 5.0 cfm/sf, or greater than about 10.0 cfm/sf. Or, the air permeability of the filter media may be less than about 50 cfm/sf, less than about 40 cfm/sf, less than about 30 cfm/sf, less than about 20 cfm/sf, less than about 15 cfm/sf, less than about 10 cfm/sf, or less than about 5 cfm/sf. It should be understood that the air permeability of the filter media may be between any of the above-noted lower limits and upper limits. Further, in some embodiments, the air permeability of the filter media may be between about 0.1 cfm/sf and about 50 cfm/sf, between about 0.5 cfm/sf and about 30 cfm/sf, between about 0.5 cfm/sf and about 10 cfm/sf, between about 0.5 cfm/sf and about 5 cfm/sf, between about 1 cfm/sf and about 15 cfm/sf, or between about 1.0 cfm/sf and about 3.5 cfm/sf.

The filter media may exhibit enhanced absorption and/or adsorption characteristics (e.g., due to the filter media having a relatively high percentage of functional particles).

In some embodiments, the filter media may readily absorb certain types of matter (e.g., water, vapor, other types of fluid or particles) from the surrounding environment. As provided herein, the absorption of the filter media is determined by exposing a dry 12.7 mm×38.1 mm sample of filter media to a moist environment and measuring the relative change in weight of the filter media over a particular period of time. A variety of suitable conditions may be taken to sufficiently dry the filter media and measure the relative change in weight of the filter media over a time period in which the filter media is exposed to a moist environment. For instance, an exemplary procedure and slight variations thereof are described below for obtaining this measurement. As such, it can be appreciated that other methods of measuring the relative change in weight of the filter media over a particular time of exposure are also possible.

Accordingly, prior to drying the filter media and exposing the filter media to the moist environment, the filter media may be placed on a pre-weighted pan (e.g., an aluminum foil pan) and the pan, together with the filter media, may be placed into an open vessel (e.g., an aluminum beaker). To dry the filter media, the vessel, containing the pan and the filter media therein, may be placed into an oven set to a suitable temperature for an appropriate amount of time until residual moisture in the filter media is substantially eliminated. The oven may be set at a range, for example, of between approximately 100° C. and approximately 160° C. (e.g., 100° C., 110° C., 120° C., 130° C., 140° C., 150° C., 160° C., etc.). Additionally, an appropriate time for which the filter media is placed in the oven set at a suitable temperature may, for example, be between approximately 2 hours and approximately 20 hours (e.g., 3 hours, 4 hours, 5 hours, 6 hours, 7 hours, 8 hours, 10 hours, 12 hours, 14 hours, 15 hours, 15.5 hours, 16 hours, 16.5 hours, 17 hours, 17.5 hours, 18 hours, 18.5 hours, 19 hours, etc.). Once the filter media is dried, the vessel may be tightly covered so as to isolate the pan and filter media from the surrounding environment.

The closed vessel with the pan and filter media may then be cooled to room temperature in a desiccator for a suitable amount of time (e.g., 15-20 minutes). After drying and desiccation, the filter media is weighed (with the vessel and pan) and the pan carrying the filter media is subsequently transferred quickly to a 500 mL container having 25 mL of distilled water at the bottom of the container, with the container sealed under ambient conditions (e.g., closed jar). While inside the sealed container, the filter media may rest upon a platform elevated above the surface of the water so that the filter media is free of contact from the water. The sealed container within which the filter media and the water resides provides a relatively humid environment for the filter media to absorb water vapor. Accordingly, the filter media absorbs water from the surrounding environment and steadily gains weight over time.

After exposure within the moist environment, the filter media may be weighed at suitable time increments of, for example, 30 minutes, 1 hour, 1.5 hours, 2 hours, 2.5 hours, 3 hours, 3.5 hours, 4 hours, 4.5 hours, 8 hours, 18 hours, and 24 hours. The heavier the filter media, the more moisture is absorbed. The relative weight change of the filter media may be determined by quickly transferring the pan carrying the filter media back into the closed lid vessel (which has been pre-weighed by itself), weighing the vessel containing the pan and filter media, and then calculating the percent weight change of the filter media.

The filter media may readily adsorb matter, e.g., small organic or inorganic particles. Adsorption is a surface phenomenon characteristic of the filter media that is determined by placing the filter media in an environment of 2,2,4-trimethylpentane (TMP) and measuring the relative change in weight of the filter media over a particular period of time. In measuring TMP adsorption, the same conditions as discussed above with respect to moisture absorption are used except that, the sealed container includes 25 mL of TMP (measured through gas chromatography to be 99.9% pure) at the bottom of the container, instead of water. The filter media adsorbs TMP from the surrounding environment which increases its weight. Upon exposure to the sealed TMP environment, the filter media is weighed at suitable time increments (e.g., after 30 minutes, after 1 hour, after 1.5 hours, after 2 hours, after 2.5 hours, after 3 hours, after 3.5 hours, after 4 hours, etc.).

As absorption (e.g., of water) and adsorption (e.g., of TMP) are both based on the weight of the filter media before and after exposure to the appropriate environment, the level of absorption and adsorption of the filter media is given by a percentage, calculated by the following relationship:

Absorption/Adsorption Percentage (%)=(Final weight of the filter media−Initial weight of the filter media)/(Initial weight of the filter media)*100

In some embodiments, the filter media may exhibit a percentage weight increase after 3 hours exposure to the moist environment, due to absorption using the moisture method described above, of greater than about 10%, greater than about 15%, greater than about 20%, greater than about 25%, greater than about 30%, greater than about 35%, greater than about 40%, greater than about 45%, or greater than about 50%. For example, the percentage weight increase of the filter media after 3 hours exposure to the moist environment may be between about 5% and about 70%, between about 10% and about 65%, between about 15% and about 60%, between about 20% and about 50%, between about 30% and about 45%, or between about 35% and about 40%.

In some embodiments, the filter media may exhibit a percentage weight increase after 3.5 hours exposure to the moist environment, due to absorption using the moisture method described above, of greater than about 10%, greater than about 15%, greater than about 20%, greater than about 25%, greater than about 30%, greater than about 35%, greater than about 40%, greater than about 45%, or greater than about 50%. For example, the percentage weight increase of the filter media after 3.5 hours exposure to the moist environment may be between about 5% and about 70%, between about 10% and about 65%, between about 15% and about 60%, between about 20% and about 50%, between about 30% and about 60%, between about 40% and about 55%, between about 45% and about 55%, between about 30% and about 45%, or between about 35% and about 40%.

In some embodiments, the filter media may exhibit a percentage weight increase after 24 hours exposure to the moist environment of greater than about 50%, greater than about 60%, greater than about 70%, greater than about 80%, greater than about 90%, greater than about 100%, greater than about 110%, greater than about 120%, greater than about 130%, greater than about 140%, or greater than about 150%. For example, the percentage weight increase of the filter media after 24 hours exposure to the moist environment may be between about 40% and about 200%, between about 50% and about 150%, between about 60% and about 140%, between about 70% and about 130%, between about 80% and about 120%, or between about 90% and about 110%.

In some embodiments, due to adsorption using the TMP method described above, the filter media may exhibit a percentage weight increase after 1 hour exposure to the TMP environment of greater than about 20%, greater than about 30%, greater than about 40%, greater than about 50%, greater than about 60%, greater than about 70%, greater than about 80%, or greater than about 90%. For example, the percentage weight increase of the filter media after 1 hour exposure to the TMP environment may be between about 20% and about 120%, between about 30% and about 110%, between about 40% and about 100%, between about 50% and about 95%, between about 60% and about 95%, between about 60% and about 80%, between about 65% and about 75%, between about 70% and about 90%, or between about 80% and about 85%.

In some embodiments, due to adsorption using the TMP method described above, the filter media may exhibit a percentage weight increase after 1.5 hours exposure to the TMP environment of greater than about 20%, greater than about 30%, greater than about 40%, greater than about 50%, greater than about 60%, greater than about 70%, greater than about 80%, or greater than about 90%. For example, the percentage weight increase of the filter media after 1.5 hours exposure to the TMP environment may be between about 20% and about 120%, between about 30% and about 110%, between about 40% and about 100%, between about 50% and about 95%, between about 60% and about 95%, between about 60% and about 80%, between about 65% and about 75%, between about 70% and about 90%, between about 70% and about 80%, or between about 80% and about 85%.

In some embodiments, the filter media may exhibit a percentage weight increase after 3 hours exposure to the TMP environment of greater than about 20%, greater than about 30%, greater than about 40%, greater than about 50%, greater than about 60%, greater than about 70%, greater than about 80%, greater than about 90%, or greater than 100%. For example, the percentage weight increase of the filter media after 3 hours exposure to the TMP environment may be between about 10% and about 200%, between about 30% and about 150%, between about 40% and about 120%, between about 50% and about 100%, between about 60% and about 95%, between about 60% and about 80%, between about 65% and about 75%, between about 70% and about 90%, or between about 80% and about 85%.

In some embodiments, the filter media may exhibit a percentage weight increase after 3.5 hours exposure to the TMP environment of greater than about 20%, greater than about 30%, greater than about 40%, greater than about 50%, greater than about 60%, greater than about 70%, greater than about 80%, greater than about 90%, or greater than 100%. For example, the percentage weight increase of the filter media after 3.5 hours exposure to the TMP environment may be between about 10% and about 200%, between about 30% and about 150%, between about 40% and about 120%, between about 50% and about 100%, between about 60% and about 95%, between about 60% and about 80%, between about 65% and about 75%, between about 70% and about 90%, between about 70% and about 80%, or between about 80% and about 85%.

As discussed, in some cases, the level of fibrillation may affect the moisture absorption characteristics of the filter media. For example, when the CSF level of fibrillation of the filter media is between about 200 mL and about 400 mL (e.g., between about 200 mL and about 350 mL, between about 200 mL and about 300 mL, between about 250 mL and about 400 mL, between about 300 mL and about 400 mL, between about 250 mL and about 350 mL), exposure to a moist/TMP environment for certain periods of time (e.g., 1 hour, 3 hours, 3.5 hours, 24 hours) may result in a percentage weight increase within respective ranges described above.

The filter media may fulfill certain cleanliness requirements that are desirable for various applications (e.g., minimal levels of halogens, minimal levels of outgassing, minimal levels of heavy metals, minimal levels of certain organic compounds). For example, filter media described herein may be compliant in accordance with the Restriction of Hazardous Substances Directive (RoHS) by being within suitable levels of lead (Pb), mercury (Hg), cadmium (Cd), hexavalent chromium ($Cr^{6+}$), polybrominated biphenyls (PBB) and polybrominated diphenyl ether (PBDE) using digestion/extraction methods based on AC/RoHS/0010 version 1.1/05 "Wet Acid Digestion (Microwave)," AC/RoHS/0007 version 1.1/05 "Dry Ashing," AC/RoHS/0011 version 1.0/05, and AC/RoHS/0012 version 1.2/06 "(Microwave extraction)." The analysis of chlorinated and brominated compounds may fulfill analyses in accordance with Method BS EN 14582: 2007.

Filter media described herein may be produced using any suitable method, such as using a wet laid or a dry laid process, where the filter media produced includes fibrillated fibers along with a relatively large amount of functional particles.

In a wet laid process, various components are mixed together in a solvent (e.g., water, aqueous, non-aqueous, organic solvent); for example, fibrillated fibers (e.g., lyocell, rayon, fibrillated aramid) may be mixed together with functional particles (e.g., activated carbon), or any other components (e.g., other types of synthetic fibers), to provide a slurry. In some cases, the slurry is an aqueous-based slurry.

In some embodiments, the filter media may be produced using a beater addition process. In such a process, fibrillated fibers and functional particles are added to water so as to form an aqueous slurry. The slurry may be subject to suitable agitation, for example, provided by exposing the slurry to ultrasonic energy, shaking the container in which the slurry resides, blending the slurry, subjecting the slurry to rotating blades mounted on an axle-like shaft, subjecting the slurry to a crushing mechanism, or other techniques. Such agitation may give rise to compressive or shear forces in the slurry. In some embodiments, the slurry may form a solution with multiple phases, such as an emulsion, dispersion, co-dispersion, colloid, and/or suspension. The slurry may be agitated at an appropriate temperature, such as between about 80° F. and about 150° F., or temperatures outside of this range. The slurry may be agitated for a suitable period of time so as to result in a desirable percentage of solids in a slurry, for example, between 1% and 10%.

Other components are added to the batch one after another during constant agitation. In some cases, blades may continuously rotate so as to beat the fibrillated fibers and functional particles into a pulp slurry. As a result, long, hydrated, fibrillated fibers may be produced in the slurry, increasing the overall surface area of the mixture, without excessive shear or grinding of the material. Accordingly, hydrogen and van der Waals bonding between fibrillated fibers and functional particles may increase, resulting in the fibrillated fibers taking on a net-like configuration.

An electrostatic charge may be applied to the fibrillated fibers and functional particles. In some embodiments, an ionic agent is added to the mixture of fibrillated fibers and functional particles so as to impart an electrostatic charge to the fibers and particles. In some embodiments, the ionic agent is a cationic agent for imparting a net positive charge to the mixture of fibers and particles. For example, during a wet laid process, a cationic agent may be added to a mixture of fibrillated fibers and functional particles so as to cause the fibrillated fibers and functional particles to exhibit a net positive electrostatic charge, giving rise to a suspension with positively charged components. In some embodiments, the ionic agent is an anionic agent for imparting a net negative charge to the mixture of fibers and particles.

In some embodiments, the ionic agent comprises at least one of modified starch, alum (e.g., aluminum sulfate, potassium aluminum sulfate), polyamine, polyamide, water soluble cationic multivalent salt, cationic modified starch, polyacrylamide, non-ionic polyethylene-oxide, cationic bentonite, aluminum phyllosilicate, cationic polyamine derivative, primary amine, methylamine, ethanolamine, secondary amine, dimethylamine, methylethanolamine, biguanide, cationic amino-silicon compound, cationic cellulose derivative, cationic starch, quaternary polyglycol amine condensate, quaternary collagen polypeptide, cationic chitin derivative, melamine-formaldehyde, cyclic amine, tertiary amine, trimethylamine, aziridine, piperidine, N-methylpiperidine, aniline, aromatic amine, diallyl dimethyl ammonium halide, quaternary ammonium salt, silver-amine-halide, quaternary amine, quaternary amide, quaternary imide, benzalkonium, colloidal silica, cationic guar gum, cationic polyamide-epichlorohydrin adduct, and combinations thereof. The agent may be highly ionic (e.g., cationic, anionic) and, thus, may impart an electrostatic charge to the fibrillated fibers and functional particles. Suitable ionic agents may be obtained, for example, from Nalco, Genfloc (71000 series, 84000 series), Cartafix (GS, TSF), Kymene (913A, 557LX), Jaguar gum, Ecopol gum, Penbond (1000), Redibond (5327), National (54-3418). The agent may comprise a solvent including, for example, water, acetic acid, butanol, isopropanol, propanol, ethanol, methanol, formic acid, ethyl acetate, tetrahydrofuran, dichloromethane, acetone, acetonitrile, dimethylformamide, dimethyl sulfoxide, hexane, benzene, toluene, diethyl ether, chloroform, 1,4-dioxane, or combinations thereof. Other ionic agents may be used.

The ionic agent may be provided at any suitable weight percentage of the filter media. In some embodiments, the ionic agent may be provided to the filter media at a weight percentage of less than about 3%, less than about 2%, less than about 1%, less than about 0.5% by weight of the filter media. For example, the weight percentage of ionic agent provided to the filter media may be between about 0.01% and about 2%, between about 0.05% and about 1%, or between about 0.1% and about 0.5% by weight of the filter media.

Once the electrostatic charge is applied, the mixture of fibrillated fibers and functional particles remains as a suspension within the solvent (e.g., due to electrostatic repulsion). In some embodiments, the suspension appears as a milky liquid having a noticeable froth-like quality.

Subsequently, the binder resin, which has an electrostatic charge of opposite polarity to the mixture of fibrillated fibers and functional particles, is added to the suspension. Due to electrostatic attraction, the binder resin causes precipitation with the fibrillated fibers and functional particles, resulting in the fibrillated fibers and functional particles coalescing together with the binder material to form an aggregate of fibrillated fibers and functional particles. As a result, the aggregate of fibrillated fibers and functional particles forms a floc that phase separates from the water and the milky suspension begins to clear. During this process, a sufficient amount of binder resin is added to the fibrillated fibers and functional particles to reach a substantial isoelectric point where the respective positive and negative charges present within the composition neutralize one another. Once a substantial isoelectric point is reached, the suspension has almost completely cleared.

The aggregate of fibrillated fibers and functional particles is then optionally diluted, for example, to a 2-3% consistency and formed into a filter media. For instance, the aggregate may enter into a headbox as a furnish for further processing. Once the furnish including the aggregate exits out of a headbox, it is formed on to a wire where further manipulation, such as drying and optional incorporation of one or more suitable additives or resin to the media may occur.

In some embodiments, the aggregate of fibrillated fibers and functional particles is formed as a filter media directly on to a scrim which provides mechanical support for the media. For example, rather than having a wet laid filter media formed directly on a wire and a scrim subsequently adhered to the filter media, the scrim may be placed on the wire before the fibrillated fibers and functional particles exit from the headbox for direct formation of the filter media thereon. Accordingly, the aggregate of fibrillated fibers and functional particles exit out of the headbox as a furnish and are deposited directly on to the scrim having already been placed on the wire. An adhesive may optionally be provided between the scrim and the aggregate of fibrillated fibers and functional particles so as to promote adhesion between the layers.

Forming the filter media directly on to a scrim may be advantageous as the scrim provides immediate mechanical support to the filter media. Forming the filter media directly on to the scrim may provide a further advantage in that there is little to no waste of the materials that make up the media. For instance, the scrim may serve as a net that substantially prevents loss of fibers or particles after exiting the headbox. As a result, substantially all of the fibrillated fibers and functional particles (e.g., up to 99%) of the wet laid furnish may be retained in the filter media, improving overall strength and processability of the filter media.

In some embodiments, the filter media is dried at temperatures above the melting temperature of the adhesive between the filter media and the scrim so that a strong attachment is formed. Once the filter media is formed, a chiller roll may be used at the end of the process for setting the adhesive between the filter media and the scrim.

Once formed, due to the high percentage of functional particles, openings of the filter media between fibrils may be observed to be substantially filled with functional particles.

In some embodiments, the overall thickness of the filter media may be maintained (e.g., not compressed down to a smaller thickness) so as to preserve air permeability. Though, in some cases, due to application requirements, it may be preferable for the filter media to be pressed down to a particular thickness (e.g., with a hot calender).

Manufacturing processes for further filtration arrangements are possible. In certain embodiments, two or more layers are formed via a wet laid process. For example, a first dispersion (e.g., a pulp) containing fibers and other materials (e.g., functional particles, synthetic fibers, binder resin, etc.) in a solvent (e.g., an aqueous solvent such as water) can be applied onto a wire conveyor in a papermaking machine (e.g., a fourdrinier or a rotoformer) to form a first layer supported by the wire conveyor (or a scrim on the wire conveyor). A second dispersion (e.g., another pulp) containing fibers and other materials (e.g., functional particles, synthetic fibers, binder resin, etc.) in a solvent (e.g., an aqueous solvent such as water) is applied onto the first layer either at the same time or subsequent to deposition of the first layer on the wire. Vacuum may be continuously applied to the first and second dispersions of fibers during the above process to remove the solvent from the fibers, thereby resulting in an article containing first and second layers. The article thus formed is then dried and, if necessary, further processed (e.g., calendered) by using known methods to form multi-layered fiber webs or filter media. In some embodiments, such a process may result in a gradient in at least one property across the thickness of the two or more layers.

The filter media disclosed herein can be incorporated into a variety of filter elements for use in various applications including those that require absorbent and/or adsorptive capabilities. For example, the filter media may be used for filtration in hard disc drives or any application related to fluid filtration (e.g., hydraulic, non-hydraulic, oil filtration, HEPA, ASHRAE, ULPA, other types of air filtration or purification). In some embodiments, filter media described herein may be used to reduce odor or colors present in a fluid. For example, such filter media may be used to reduce levels of chlorine or for taste improvement.

The filter media may be used for a number of other applications, such as for pharmaceutical manipulation, medical applications (e.g., blood filtration), face masks, cabin air filtration, military garments, HVAC systems (e.g., for industrial areas and buildings), clean rooms, water/fuel separation, dehumidification wheels, batteries, ultra-capacitors, solar cells, water filtration, or any other suitable application.

During use, the filter media mechanically traps as well as absorbs and/or adsorbs particles on or in the layers as fluid flows through the filter media. The filter media need not be electrically charged to enhance trapping of contamination. Thus, in some embodiments, the filter media are not electrically charged. However, in some embodiments, the filter media may be electrically charged.

EXAMPLES

The following examples are intended to illustrate certain embodiments of the present invention, but are not to be construed as limiting and do not exemplify the full scope of the invention.

Nine different types of filter media (Examples 1-9) were produced including lyocell fibers, activated carbon, polyester, and a binder resin. The lyocell fibers were prepared from a lyocell pulp to have varying levels of CSF fibrillation, 10 mL (Examples 4 and 9), 100 mL (Examples 3 and 8), 300 mL (Examples 2 and 7), 390 mL (Example 6) and 410 mL (Examples 1 and 5). Two different wood-based activated carbons were used, NUCHAR WV-B-1500 LP and NUCHAR SA-1500 SP, both obtained commercially and having a surface area of between 2000-2400 m²/g. The polyester had an average length of 0.25 inches and was 1.5 denier. HYCAR, an acrylic emulsion obtained from Lubrizol, was provided as a binder resin having a negative electrostatic charge.

The relative weight percentages of the components for Examples 1-9 are listed in Table 1 provided below. The primary compositional difference between each of Examples 1-4 is the level of fibrillation, recorded as a CSF value. The relative concentrations for all of the other components of the Examples are substantially the same. For each filter media, the first and second types of activated carbon were provided at a ratio of 50:50, making up approximately 83% weight percent of the web. The weight percentage of lyocell fibers of the filter media was about 8.8%.

TABLE 1

Filter media compositions for Examples 1-9.

|  | Example 1 | Example 2 | Example 3 | Example 4 |
|---|---|---|---|---|
| CSF (mL) | 410 | 300 | 100 | 10 |
| First type of activated carbon (wt. %) | 41.62 | 41.62 | 41.61 | 41.61 |
| Second type of activated carbon (wt. %) | 41.62 | 41.62 | 41.61 | 41.61 |
| Polyester (wt. %) | 1.39 | 1.39 | 1.39 | 1.39 |
| Lyocell (wt. %) | 8.79 | 8.79 | 8.78 | 8.78 |
| Latex binder (wt. %) | 5.66 | 5.66 | 5.66 | 5.66 |
| Other materials (wt. %) | 0.93 | 0.93 | 0.98 | 0.98 |

|  | Example 5 | Example 6 | Example 7 | Example 8 | Example 9 |
|---|---|---|---|---|---|
| CSF (mL) | 410 | 390 | 300 | 100 | 10 |
| First type of activated carbon (wt. %) | 41.62 | 41.62 | 41.62 | 41.62 | 41.62 |
| Second type of activated carbon (wt. %) | 41.62 | 41.62 | 41.62 | 41.62 | 41.62 |
| Polyester (wt. %) | 1.39 | 1.39 | 1.39 | 1.39 | 1.39 |
| Lyocell (wt. %) | 8.79 | 8.79 | 8.79 | 8.79 | 8.79 |
| Latex binder (wt. %) | 5.66 | 5.66 | 5.66 | 5.66 | 5.66 |
| Other materials (wt. %) | 0.93 | 0.93 | 0.93 | 0.93 | 0.93 |

The process for forming the filter media of Examples 1-9 was a beater addition process as described above For each Example, the filter media were prepared according to two different processes.

The first process involves forming the filter media directly on to the wire where the furnish is allowed to dry as traditionally would be the case for filter media formation. No scrim was subsequently adhered to the filter media.

The second process involves forming the filter media directly on to a scrim that was placed on the wire prior to the furnish exiting the headbox. This process improved overall retention of the lyocell and activated carbon. With more lyocell and activated carbon retained in the filter media, the overall absorption and adsorption performance was observed to be greater.

The scrim used in the Examples was a 100% polyester scrim produced using a smooth roll thermal bond. The scrim had a basis weight of 16 g/m² (measured using ASTM D3776), a thickness of 1.5 mils (measured using ASTM D1777), and a machine direction tensile strength of 4.5 lbs/in (measured using D1777-80).

The filter media, with and without the scrim, was then subject to optional hot calendering depending on the final thickness desired.

Figure 2A:
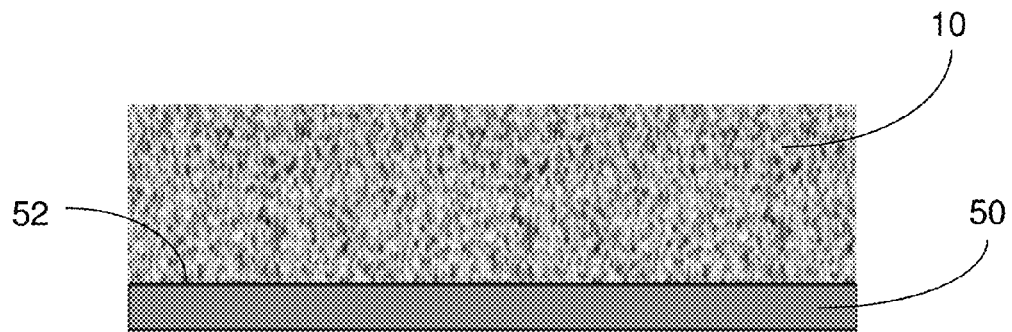
FIG. 2A depicts an example of a filter media and a scrim in accordance with some embodiments.
Figure 2B:
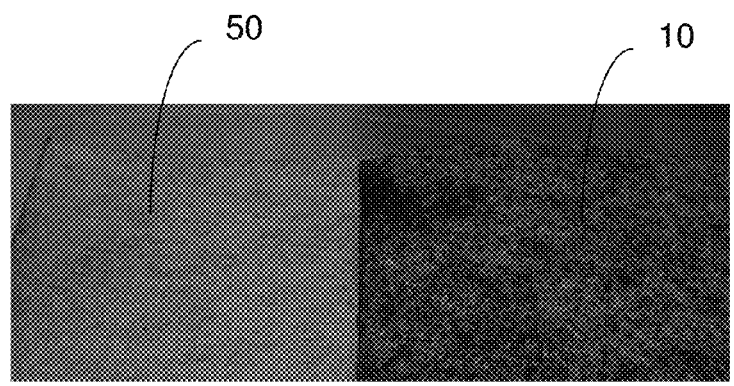
FIG. 2B illustrates another example of a filter media and a scrim in accordance with some embodiments.

FIG. 2A illustrates a cross section of a composite where a filter media 10 is formed on to a scrim 50. The filter media 10 includes a composite of lyocell, activated carbon, binder, and other materials used during formation. The scrim 50 includes an adhesive 52 having a relatively low melting point that bonds the filter media and the scrim together. FIG. 2B depicts a sheet, half of which includes the scrim 50 and half of which does not include the scrim. That is, in FIG. 2B, the portion of the sheet shown on the right includes only the filter media 10 without the scrim and the portion of the sheet shown on the left of the figure includes the scrim 50 adhered to the filter media.

Tables 2 and 3 provided below shows various structural and performance properties, respectively, for Examples 1-9 where properties were measured according to four different processing parameters—1) filter media not formed on to a scrim and uncalendered; 2) filter media formed not formed on to a scrim and calendered; 3) filter media formed directly on to a scrim and uncalendered; and 4) filter media formed directly on to a scrim and calendered.

TABLE 2

Structural Properties for Examples 1-9.

| | Basis Weight (lb/ream; g/m²) | Caliper (inches; mm) | Density (lb/ft³; g/cm³) | Activated carbon (%) | Activated carbon (g/m²) |
|---|---|---|---|---|---|
| Example 1 (CSF 410 mL) | | | | | |
| Uncalendered no scrim | 336.6; 548.2 | | | 83.2 | 445.4 |
| Calendered no scrim | 331.9; 540.6 | 0.0724; 1.84 | 18.34; 0.29 | 83.2 | 436.9 |
| Uncalendered with scrim | 352.3; 573.8 | | | ~80 | 461.0 |
| Calendered with scrim | 348.4; 567.4 | 0.0737; 1.87 | 18.91; 0.30 | ~80 | 446.1 |
| Example 2 (CSF 300 mL) | | | | | |
| Uncalendered no scrim | 328.7; 535.3 | | | 83.2 | 464.7 |
| Calendered no scrim | 322.4; 525.1 | 0.0719; 1.83 | 17.94; 0.29 | 83.2 | 449.8 |
| Uncalendered with scrim | 356.2; 580.1 | | | ~80 | 477.0 |
| Calendered with scrim | 345.2; 562.2 | 0.0723; 1.84 | 19.1; 0.31 | ~80 | 461.7 |
| Example 3 (CSF 100 mL) | | | | | |
| Uncalendered no scrim | 342.9; 558.5 | | | 83.2 | 453.9 |
| Calendered no scrim | 331.9; 540.6 | 0.0718; 1.82 | 18.49; 0.30 | 83.2 | 442.3 |
| Uncalendered with scrim | 368.0; 599.3 | | | ~80 | 467.4 |
| Calendered with scrim | 356.7; 580.9 | 0.0729; 1.85 | 19.57; 0.31 | ~80 | 457.8 |
| Example 4 (CSF 10 mL) | | | | | |
| Uncalendered no scrim | 335.0; 545.6 | | | 83.2 | 456.1 |
| Calendered no scrim | 326.4; 531.6 | 0.0712; 1.81 | 18.34; 0.29 | 83.2 | 449.8 |
| Uncalendered with scrim | 361.0; 587.9 | | | ~80 | 455.7 |
| Calendered with scrim | 353.9; 576.4 | 0.0714; 1.81 | 19.83; 0.32 | ~80 | 450.4 |
| Example 5 (CSF 410 mL) | | | | | |
| Uncalendered no scrim | 364.1; 593.0 | | | 83.2 | 492.2 |
| Calendered no scrim | 354.7; 577.7 | 0.0724; 1.84 | 19.60; 0.31 | 83.2 | 479.5 |
| Uncalendered with scrim | 352.3; 573.8 | | | ~80 | 454.7 |
| Calendered with scrim | 348.4; 567.4 | 0.0713; 1.81 | 19.55; 0.31 | ~80 | 449.4 |
| Example 6 (CSF 390 mL) | | | | | |
| Uncalendered no scrim | 354.7; 577.7 | | | 83.2 | 480.6 |
| Calendered no scrim | 350.7; 571.2 | 0.0721; 1.83 | 19.46; 0.31 | 83.2 | 475.2 |
| Uncalendered with scrim | 353.8; 576.2 | | | ~80 | 456.7 |
| Calendered with scrim | 346.8; 564.8 | 0.0720; 1.83 | 19.27; 0.31 | ~80 | 447.2 |
| Example 7 (CSF 300 mL) | | | | | |
| Uncalendered no scrim | 353.9; 576.4 | | | 83.2 | 479.6 |
| Calendered no scrim | 347.6; 566.1 | 0.0726; 1.84 | 19.15; 0.31 | 83.2 | 471.0 |
| Uncalendered with scrim | 355.5; 579.0 | | | ~80 | 460.1 |

TABLE 2-continued

Structural Properties for Examples 1-9.

| | Basis Weight (lb/ream; g/m$^2$) | Caliper (inches; mm) | Density (lb/ft$^3$; g/cm$^3$) | Activated carbon (%) | Activated carbon (g/m$^2$) |
|---|---|---|---|---|---|
| Calendered with scrim | 354.7; 577.7 | 0.0722; 1.83 | 19.65; 0.31 | ~80 | 459.0 |
| Example 8 (CSF 100 mL) | | | | | |
| Uncalendered no scrim | 342.9; 558.5 | | | 83.2 | 479.6 |
| Calendered no scrim | 341.3; 555.9 | 0.0727; 1.85 | 18.78; 0.30 | 83.2 | 471.0 |
| Uncalendered with scrim | 357.0; 581.4 | | | ~80 | 460.1 |
| Calendered with scrim | 351.5; 572.5 | 0.0725; 1.84 | 19.39; 0.31 | ~80 | 459.0 |
| Example 9 (CSF 10 mL) | | | | | |
| Uncalendered no scrim | 353.9; 576.4 | | | 83.2 | 479.4 |
| Calendered no scrim | 349.2; 568.7 | 0.0720; 1.83 | 19.40; 0.31 | 83.2 | 473.2 |
| Uncalendered with scrim | 362.5; 590.4 | | | ~80 | 468.5 |
| Calendered with scrim | 360.2; 586.6 | 0.0731; 1.86 | 19.71; 0.32 | ~80 | 465.3 |

TABLE 3

Performance Properties for Examples 1-9.

| | Air Permeability (cfm/sf) | Tensile Strength (lb/inch) | Moisture Absorption measured after 24 hours (%) | TMP Adsorption measured after 3.5 hours (%) |
|---|---|---|---|---|
| Example 1 (CSF 410 mL) | | | | |
| Uncalendered no scrim | 9.6 | | | |
| Calendered no scrim | 2.8 | | | |
| Uncalendered with scrim | 9.8 | | | |
| Calendered with scrim | 2.2 | 12.0 | | |
| Example 2 (CSF 300 mL) | | | | |
| Uncalendered no scrim | 10.8 | | | |
| Calendered no scrim | 2.5 | | | |
| Uncalendered with scrim | 11.8 | | | |
| Calendered with scrim | 2.2 | 12.5 | | |
| Example 3 (CSF 100 mL) | | | | |
| Uncalendered no scrim | 6.3 | | | |
| Calendered no scrim | 1.9 | | | |
| Uncalendered with scrim | 6.5 | | | |
| Calendered with scrim | 0-1.8 | 15.3 | | |
| Example 4 (CSF 10 mL) | | | | |
| Uncalendered no scrim | 3.5 | | | |
| Calendered no scrim | 0-1.8 | | | |
| Uncalendered with scrim | 3.3 | | | |
| Calendered with scrim | 0 | 14.2 | | |
| Example 5 (CSF 410 mL) | | | | |
| Uncalendered no scrim | 11.0 | | | |
| Calendered no scrim | 3.3 | | 97.5 | 76.0 |
| Uncalendered with scrim | 13.7 | | | |
| Calendered with scrim | 4.5 | | 93.58; 96.20* | 69.7; 73.7* |
| Example 6 (CSF 390 mL) | | | | |
| Uncalendered no scrim | 12.5 | | | |
| Calendered no scrim | 2.9 | | 107 | 81.9 |
| Uncalendered with scrim | 12.8 | | | |
| Calendered with scrim | 3.4 | | 101.29; 103.91* | 76.2; 80.5* |
| Example 7 (CSF 300 mL) | | | | |
| Uncalendered no scrim | 9.5 | | | |

TABLE 3-continued

Performance Properties for Examples 1-9.

| | Air Permeability (cfm/sf) | Tensile Strength (lb/inch) | Moisture Absorption measured after 24 hours (%) | TMP Adsorption measured after 3.5 hours (%) |
|---|---|---|---|---|
| Calendered no scrim | 2.6 | | 111.0 | 82.3 |
| Uncalendered with scrim | 10.8 | | | |
| Calendered with scrim | 3.1 | | 102.67; 105.42* | 76.7; 80.6* |
| Example 8 (CSF 100 mL) | | | | |
| Uncalendered no scrim | 5.6 | | | |
| Calendered no scrim | 2.2 | | 106.4 | 79.9 |
| Uncalendered with scrim | 4.6 | | | |
| Calendered with scrim | 2.1 | | 99.86; 102.40* | 72.4; 75.6* |
| Example 9 (CSF 10 mL) | | | | |
| Uncalendered no scrim | 3.9 | | | |
| Calendered no scrim | 2.0 | | 107 | 76.5 |
| Uncalendered with scrim | 4.6 | | | |
| Calendered with scrim | 2.1 | | 99.24; 101.93* | 72.5; 76.2* |

*Percent change in weight adjusted for the weight of the scrim

It is noted that in the last two columns of Table 3, there are two types of estimations of the percent change in weight for filter media formed directly on to a scrim—one that does not adjust for the weight of the scrim itself; and one that does adjust for the weight of the scrim.

The first value listed in the last two columns of Table 3 for the percent change in weight of the filter media due to moisture absorption and TMP adsorption (e.g., 93.58% for moisture absorption and 69.7% for TMP adsorption in Example 5) does not adjust for the weight of the scrim. That is, the combined weight of the filter media and scrim was measured before and after exposure of the filter media and scrim to the moist/TMP environment. Respective values of percent moisture absorption and TMP adsorption were then calculated based on the combined weight of the initial filter media and scrim prior to exposure and the combined weight of the final filter media and scrim after exposure.

The second value listed in the last two columns of Table 3 for the percent change in weight of the filter media due to moisture absorption and TMP adsorption (e.g., 96.20% for moisture absorption and 73.7% for TMP adsorption in Example 5, designated by the "*") does adjust for the weight of the scrim. Accordingly, the combined weight of the filter media and scrim was measured before and after exposure of the filter media and scrim to the moist or TMP environment. To estimate the percent change in weight of the filter media itself, the original weight of the scrim was subtracted from both the combined weight of the initial filter media and scrim prior to exposure and the combined weight of the final filter media and scrim after exposure. Respective values of percent moisture absorption and TMP adsorption were then calculated based on the estimated weight of the initial filter media prior to exposure and the estimated weight of the final filter media after exposure.

Figure 3:
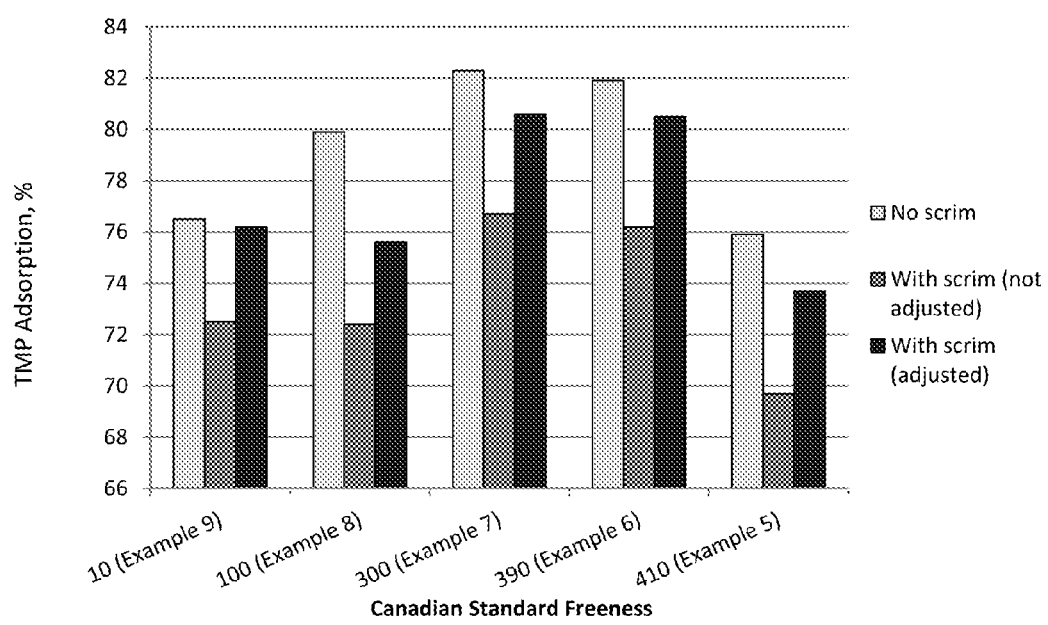
FIG. 3 is a graph showing adsorption results for filter media described in the Examples.

FIG. 3 reflects the TMP adsorption data recorded in Table 3 comparing filter media having different levels of fibrillation as well as whether the filter media was directly formed on to a scrim. In each case, the weight of the filter media was measured after 3.5 hours of exposure to the TMP environment. As shown, the filter media of Example 7, which has a CSF of approximately 300 mL, was observed to exhibit the greatest amount of TMP adsorption whether or not the filter media was formed directly on to the scrim. The filter media of Example 6, which has a CSF of approximately 390 mL, was also observed to exhibit a relatively high amount of TMP adsorption.

Figure 4A:
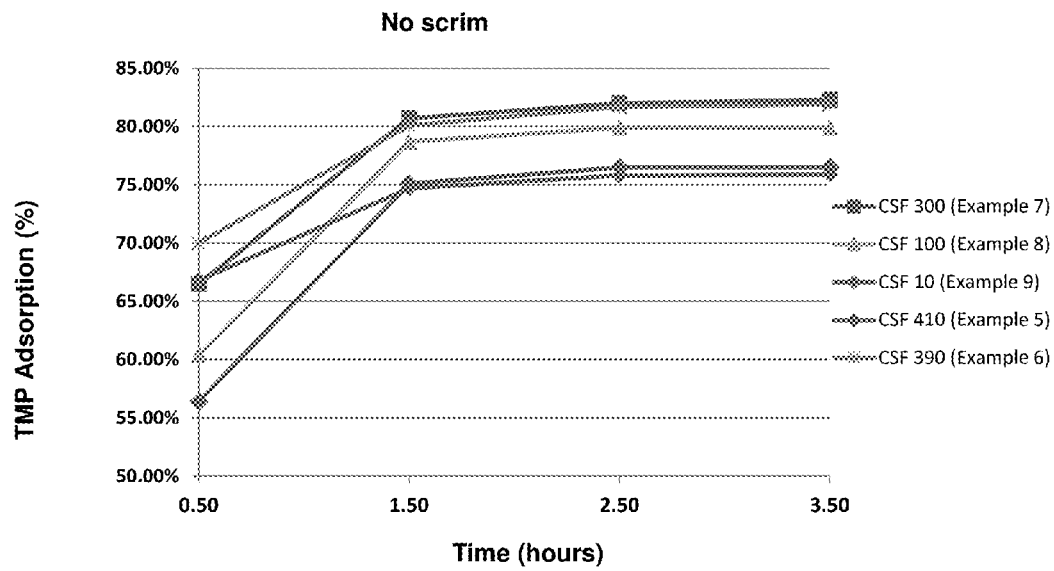
FIGS. 4A-4B are graphs showing more adsorption results for filter media described in the Examples.
Figure 4B:
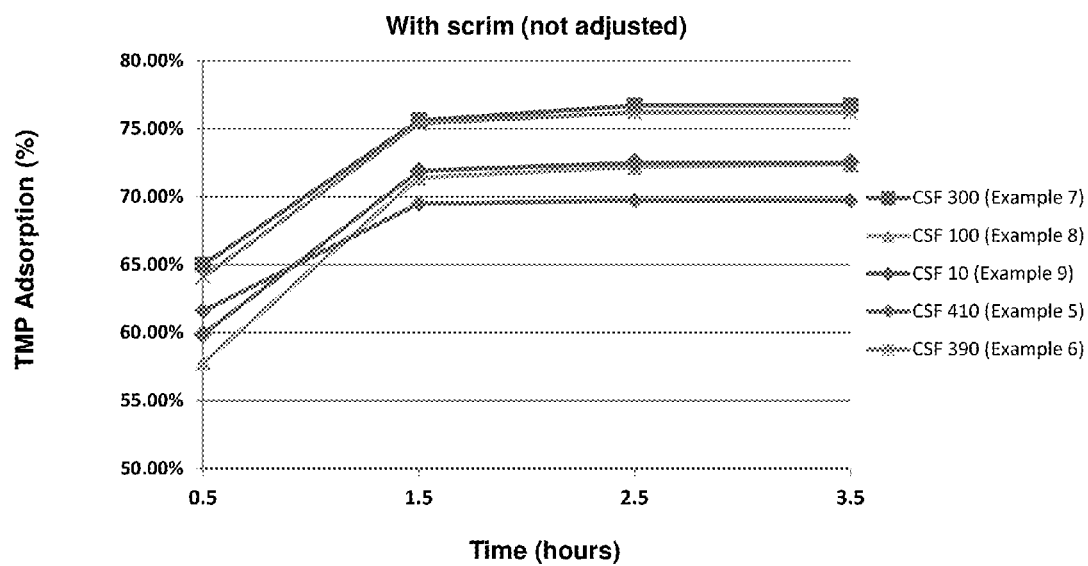

FIGS. 4A-4B illustrate TMP adsorption results over time comparing filter media having different levels of fibrillation as well as whether the filter media was or was not adhered to a scrim. In FIG. 4A, the weight of the filter media (without a scrim) was recorded after exposure to the TMP environment at 30 minutes, 1.5 hours, 2.5 hours, and 3.5 hours. In FIG. 4B, similar data is shown with the exception that the filter media was formed directly on to a scrim. It was observed, for cases both with and without a scrim, that the amount of TMP adsorption of the filter media began to level off after about 1.5 hours of exposure to the TMP environment.

Figure 5:
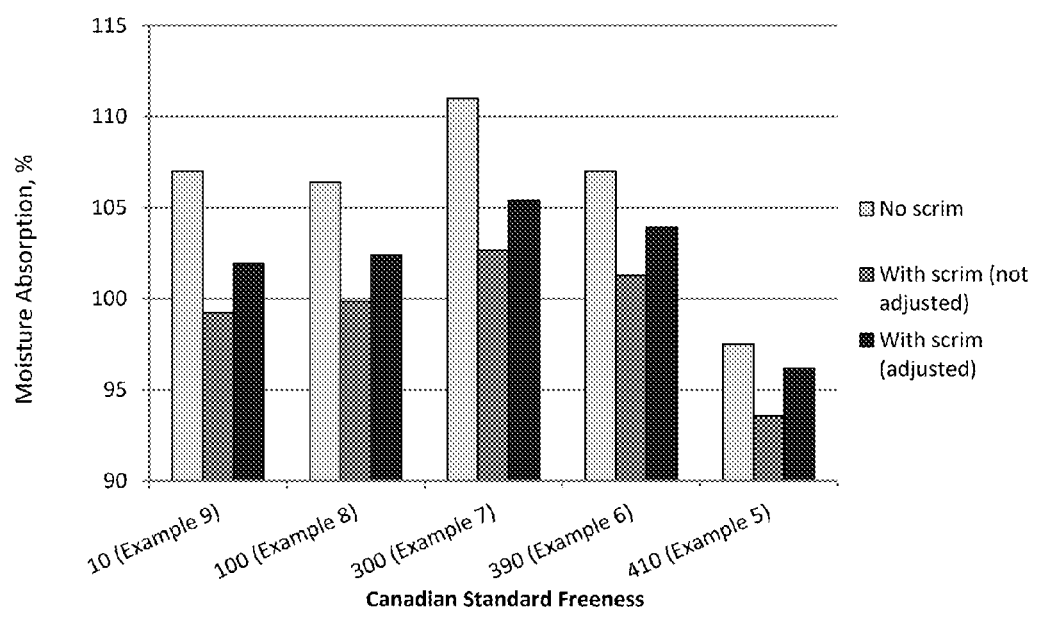
FIG. 5 is a graph showing absorption results for filter media described in the Examples.

FIG. 5 reflects the moisture absorption data recorded in Table 3 comparing filter media having different levels of fibrillation as well as whether the filter media was directly formed on to a scrim. In each case, the weight of the filter media was measured after 24 hours of exposure to the moist environment. As shown, the filter media of Example 7, which has a CSF of approximately 300 mL, was observed to exhibit the greatest amount of moisture absorption whether or not the filter media was formed directly on to the scrim.

Figure 6A:
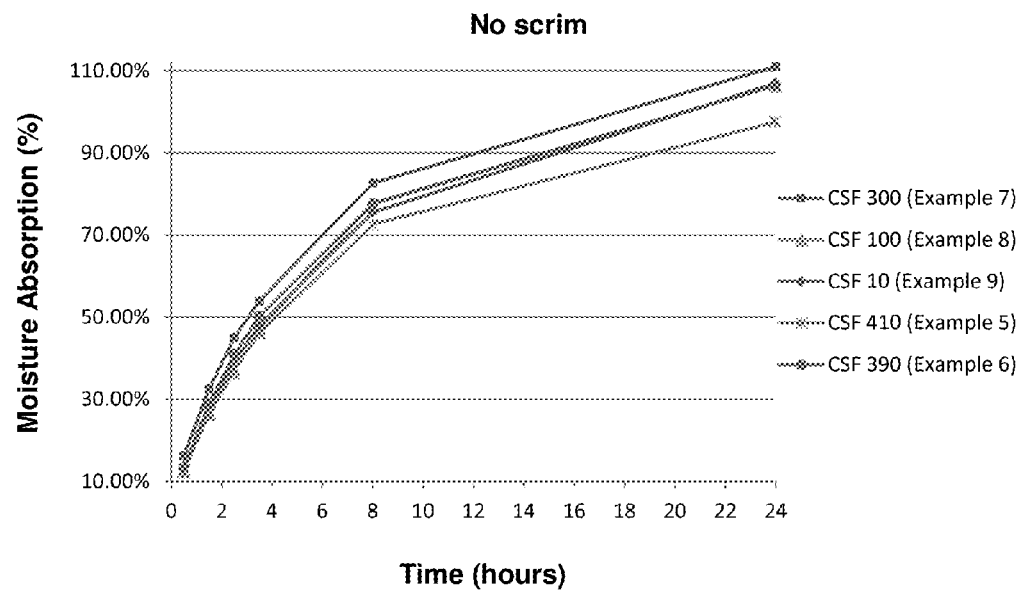
FIGS. 6A-6B are graphs showing more absorption results for filter media described in the Examples.
Figure 6B:
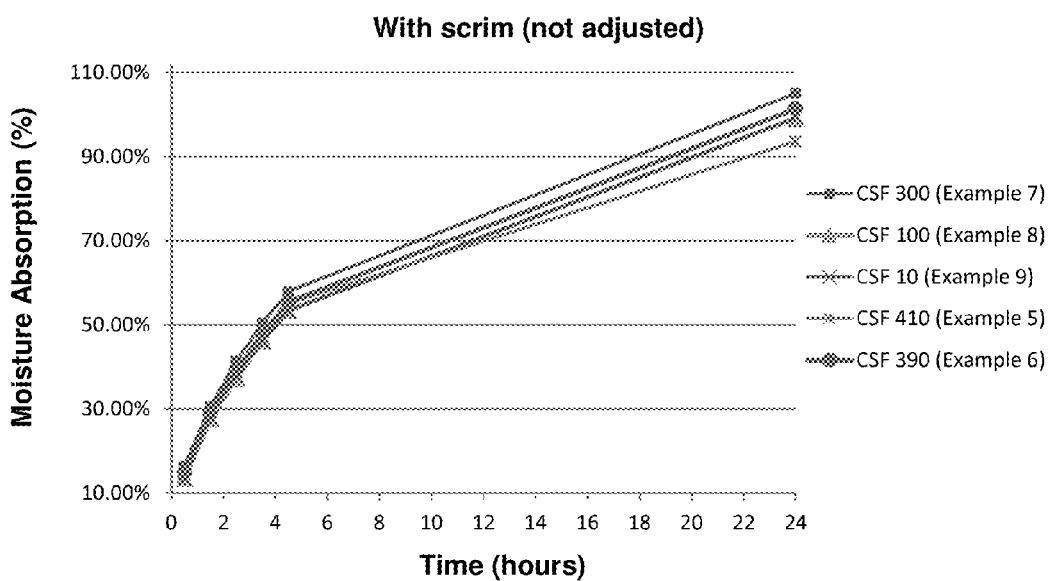

FIGS. 6A-6B illustrate moisture absorption results over time comparing filter media having different levels of fibrillation as well as whether the filter media was or was not adhered to a scrim. In FIG. 6A, the weight of the filter media (without a scrim) was recorded after exposure to the moist environment at 30 minutes, 1.5 hours, 2.5 hours, 3.5 hours, 8.0 hours and 24 hours. In FIG. 6B, similar data is shown with the exception that the filter media was formed directly on to a scrim. In this case, the weight of the filter media was recorded after exposure to the moist environment at 30 minutes, 1.5 hours, 2.5 hours, 3.5 hours, 4.5 hours and 24 hours. It was observed, for cases both with and without a scrim, that the amount of moisture absorption of the filter media continued to increase even after about 24 hours of exposure to the moist environment.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A filter media comprising fibrillated fibers and functional particles, wherein the fibrillated fibers have a Canadian Standard Freeness level of fibrillation of between about 110 mL and about 800 mL and the functional particles comprise greater than about 25% by weight of the filter media, wherein the functional particles have an average surface area of greater than about 900 m²/g.

2. The filter media of claim 1, wherein the fibrillated fibers have a Canadian Standard Freeness level of fibrillation of between about 110 and about 650.

3. The filter media of claim 1, wherein the fibrillated fibers have a Canadian Standard Freeness level of fibrillation of between about 150 and about 350.

4. The filter media of claim 1, wherein the fibrillated fibers comprise between about 4% and about 50% of the filter media.

5. The filter media of claim 4, wherein the fibrillated fibers comprise between about 5% and about 20% of the filter media.

6. The filter media of claim 1, wherein the fibrillated fibers comprise regenerated cellulose fibers.

7. The filter media of claim 1, wherein the functional particles have an average surface area of greater than about 1200 $m^2/g$.

8. The filter media of claim 1, wherein the functional particles comprise between about 50% and about 95% by weight of the filter media.

9. The filter media of claim 1, wherein the functional particles comprise between about 70% and about 95% by weight of the filter media.

10. The filter media of claim 1, wherein the functional particles comprise activated carbon.

11. The filter media of claim 1, further comprising a binder material comprising between about 3% and about 15% by weight of the filter media.

12. The filter media of claim 1, further comprising non-fibrillated fibers, wherein the non-fibrillated fibers comprise less than about 10% by weight of the filter media.

13. The filter media of claim 1, further comprising a scrim.

14. The filter media of claim 1, wherein the filter media exhibits a moisture absorption of greater than about 20% by weight after 3 hours of exposure to a moist environment.

15. The filter media of claim 14, wherein the filter media exhibits a moisture absorption of between about 20% and about 50% by weight after 3 hours of exposure to the moist environment.

16. The filter media of claim 1, wherein the filter media exhibits a moisture absorption of greater than about 50% by weight after 24 hours of exposure to a moist environment.

17. The filter media of claim 16, wherein the filter media exhibits a moisture absorption of between about 50% and about 150% by weight after 24 hours of exposure to the moist environment.

18. The filter media of claim 1, wherein the filter media exhibits a TMP adsorption of greater than about 30% by weight after 3 hours of exposure to a TMP environment.

19. The filter media of claim 18, wherein the filter media exhibits a TMP adsorption of between about 30% and about 110% after 3 hours of exposure to the TMP environment.

20. The filter media of claim 1, wherein the filter media has an air permeability of between about 1.5 cfm/sf and about 30 cfm/sf.

21. The filter media of claim 1, wherein the filter media has an average surface area of between about 900 $m^2/g$ and about 2500 $m^2/g$.

22. A filter element comprising the filter media of claim 1.

23. A filter media comprising fibrillated fibers and functional particles, wherein the functional particles comprise greater than about 25% by weight of the filter media and have an average surface area of greater than about 900 $m^2/g$, wherein the filter media exhibits a moisture absorption of greater than about 20% by weight after 3 hours of exposure to a moist environment.

24. The filter media of claim 23, wherein the filter media exhibits a moisture absorption of between about 20% and about 50% by weight after 3 hours of exposure to the moist environment.

25. The filter media of claim 23, wherein the filter media exhibits a TMP adsorption of greater than about 30% by weight after 3 hours of exposure to a TMP environment.

26. The filter media of claim 25, wherein the filter media exhibits a TMP adsorption of between about 30% and about 110% after 3 hours of exposure to the TMP environment.

27. The filter media of claim 23, wherein the fibrillated fibers have a Canadian Standard Freeness level of fibrillation of between about 110 mL and about 650 mL.

28. The filter media of claim 23, wherein the functional particles have an average surface area of greater than about 1200 $m^2/g$.

29. The filter media of claim 23, further comprising a scrim.

30. The filter media of claim 23, wherein the filter media has an air permeability of between about 1.5 cfm/sf and about 30 cfm/sf.

31. The filter media of claim 23, wherein the filter media has an average surface area of between about 900 $m^2/g$ and about 2500 $m^2/g$.

32. The filter media of claim 1, wherein the filter media further comprises synthetic fibers.

* * * * *